US011902734B1

(12) United States Patent
Xu et al.

(10) Patent No.: US 11,902,734 B1
(45) Date of Patent: Feb. 13, 2024

(54) OPEN EARPHONES

(71) Applicant: SHENZHEN SHOKZ CO., LTD., Guangdong (CN)

(72) Inventors: Jiang Xu, Shenzhen (CN); Haofeng Zhang, Shenzhen (CN); Zeying Zheng, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 0 days.

(21) Appl. No.: 18/366,142

(22) Filed: Aug. 7, 2023

Related U.S. Application Data

(63) Continuation of application No. PCT/CN2023/079401, filed on Mar. 2, 2023.

(30) Foreign Application Priority Data

| | | |
|---|---|---|
| Oct. 28, 2022 | (CN) | 202211336918.4 |
| Dec. 1, 2022 | (CN) | 202223239628.6 |
| Dec. 30, 2022 | (WO) | PCT/CN20221443339 |

(51) Int. Cl.
*H04R 25/00* (2006.01)
*H04R 1/10* (2006.01)

(52) U.S. Cl.
CPC .......... *H04R 1/105* (2013.01); *H04R 1/1016* (2013.01)

(58) Field of Classification Search
CPC . H04R 1/00; H04R 1/02; H04R 1/021; H04R 1/026; H04R 1/028; H04R 1/06
See application file for complete search history.

(56) References Cited

U.S. PATENT DOCUMENTS

2007/0009133 A1 1/2007 Gerkinsmeyer
2016/0134957 A1* 5/2016 Jentz .................... H04R 1/105 381/380
2020/0196062 A1 6/2020 Zhang

FOREIGN PATENT DOCUMENTS

| | | | |
|---|---|---|---|
| CN | 203968330 | U | 11/2014 |
| CN | 210053540 | U | 2/2020 |
| CN | 212909891 | U | 4/2021 |
| CN | 113301463 | A | 8/2021 |
| CN | 113573215 | A | 10/2021 |
| CN | 114286228 | A | 4/2022 |
| CN | 114286240 | A | 4/2022 |
| CN | 115175069 | A | 10/2022 |
| JP | 2010193344 | A | 9/2010 |

OTHER PUBLICATIONS

International Search Report in PCT/CN2023/079401 dated Jun. 29, 2023, 8 pages.
Written Opinion in PCT/CN2023/079401 dated Jun. 29, 2023, 8 pages.

* cited by examiner

*Primary Examiner* — Amir H Etesam
(74) *Attorney, Agent, or Firm* — Metis IP LLC

(57) ABSTRACT

The present disclosure provides an open earphone comprising: a sound producer including a transducer and a housing accommodating the transducer; and an ear hook, the ear hook including a first portion and a second portion; wherein the ear hook and the sound producer form a first projection on a first plane, the first projection including an outer contour, a first end contour, an inner contour and a second end contour, and the outer contour, the first end contour, the second end contour and a tangent segment connecting the first end contour and the second end contour jointly define a first closed curve.

20 Claims, 14 Drawing Sheets

OPEN EARPHONES

CROSS-REFERENCE TO RELATED APPLICATIONS

This application is a Continuation of International Application No. PCT/CN2023/079401, filed on Mar. 2, 2023, which claims priority to Chinese Application No. 202211336918.4, filed on Oct. 28, 2022, Chinese Application No. 202223239628.6, filed on Dec. 1, 2022, and International Application No. PCT/CN2022/144339, filed on Dec. 30, 2022, the contents of each of which are incorporated herein by reference.

TECHNICAL FIELD

The present disclosure relates to the field of acoustic technology, in particular to open earphones.

BACKGROUND

With development of acoustic output technology, acoustic output devices (e.g., earphones) have been widely used in people's daily life. The acoustic output devices can be used with electronic devices, such as mobile phones, computers, etc., to provide a user with an auditory feast. An acoustic device may generally be classified into a head-mounted type, an ear-hook type, and an in-ear type according to ways the user wears the acoustic device. The output performance of the acoustic device and the wearing experience have a significant impact on the comfort of the user.

Therefore, it is desired to provide an open earphone to improve the output performance of the acoustic output device and the wearing experience.

SUMMARY

One embodiment of the present disclosure provides an open earphone comprising: a sound producer including a transducer and a housing accommodating the transducer; and an ear hook, the ear hook including a first portion and a second portion, the first portion being hung between an ear and a head of a user, the second portion extending towards a side of the ear that is away from the head and connecting the sound producer, the sound producer being fixed in a position near an ear canal, and an opening of the ear canal being not blocked by the sound producer; wherein the ear hook and the sound producer form a first projection on a first plane, the first projection including an outer contour, a first end contour, an inner contour and a second end contour, the outer contour, the first end contour, the second end contour and a tangent segment connecting the first end contour and the second end contour jointly define a first closed curve, and when the open earphone is in a non-wearing state, a first area of the first closed curve is in a range of 1000 $mm^2$ to 1500 $mm^2$.

One embodiment of the present disclosure also provides an open headphone comprising: a sound producer including a transducer and a housing accommodating the transducer; and an ear hook, the ear hook including a first portion and a second portion, the first portion being hung between an ear and a head of a user, the second portion extending towards a side of the ear that is away from the head and connecting the sound producer, the sound producer being fixed in a position near an ear canal, and an opening of the ear canal being not blocked by the sound producer; wherein the ear hook and the sound producer form a second projection on a sagittal plane of a human body, the second projection including an outer contour, a first end contour, an inner contour, and a second end contour, the outer contour, the first end contour, the second end contour, and a tangent segment connecting the first end contour and the second end contour jointly define a second closed curve, and when the open earphone is in a non-wearing state, a second area of the second closed curve is in a range of 1100 $mm^2$ to 1700 $mm^2$.

One embodiment of the present disclosure also provides an open earphone comprising: a sound producer including a transducer and a housing accommodating the transducer; and an ear hook, the ear hook including a first portion and a second portion, the first portion being hung between an ear and a head of a user, the second portion extending towards a side of the ear that is away from the head and connecting the sound producer, the sound producer being fixed in a position near an ear canal, and an opening of the ear canal being not blocked by the sound producer; wherein when the open earphone is in a non-wearing state, the ear hook and the sound producer form a first projection in a first plane; when the open earphone is in a wearing state, the ear hook and the sound producer form a second projection on a sagittal plane of a human body, the first projection and the second projection including an outer profile, a first end contour, an inner profile, and a second end contour, respectively, the outer contour, the first end contour, the second end contour, and a tangent segment connecting the first end contour and the second end contour jointly define a first closure curve and a second closure curve, the first closed curve has a first area and the second closed curve has a second area, and a ratio of the first area to the second area being in a range from 0.75 to 0.95.

One embodiment of the present disclosure provides an open headphone comprising: a sound producer including a transducer and a housing accommodating the transducer; and an ear hook, the ear hook including a first portion and a second portion, the first portion being hung between an ear and a head of a user, the second portion extending towards a side of the ear that is away from the head and connecting the sound producer, the sound producer being fixed in a position near an ear canal, and an opening of the ear canal being not blocked by the sound producer; wherein the ear hook and the sound producer form a fifth projection on a first plane, the fifth projection includes an outer contour, a first end contour, an inner contour, and a second end contour, the outer contour, the first end contour, the second end contour, and a tangent segment connecting the first end contour and the second end contour jointly define a fifth closed curve, and when the open earphone is in a non-wearing state, a fifth area of the fifth closed curve is in a range of 400 $mm^2$ to 800 $mm^2$.

One embodiment of the present disclosure also provides an open headphone comprising: a sound producer including a transducer and a housing accommodating the transducer; and an ear hook, the ear hook including a first part and a second part, the first part being hung between the user's ear and head, the second part extending towards the side of the ear that is away from the head and connecting the sound producer, the sound producer being fixed the in a position near the ear canal, and an opening of the ear canal being not blocked by the sound producer, wherein the ear hook and the sound producer form a sixth projection on the first plane, the sixth projection including an outer contour, a first end contour, an inner contour, and a second end contour, the outer contour, the first end contour, the second end contour, and a tangent segment connecting the first end contour and the second end contour jointly define a sixth closed curve, and when the open earphone is in a wearing state, a sixth area of the sixth closed curve is in a range of 500 $mm^2$ to 900 $mm^2$.

One embodiment of the present disclosure also provides an open headphone comprising: a sound producer including a transducer and a housing accommodating the transducer; and an ear hook, the ear hook including a first portion and a second portion, the first portion being hung between an ear and a head of a user, the second portion extending towards a side of the ear that is away from the head and connecting the sound producer, the sound producer being fixed in a position near an ear canal, and an opening of the ear canal being not blocked by the sound producer; wherein when the open earphone is in a non-wearing state, the ear hook and the sound producer form a fifth projection on a first plane, when the open earphone is in a wearing state, the ear hook and the sound producer form a sixth projection on a sagittal plane of a human body, the fifth projection and the sixth projection including an outer contour, a first end contour, an inner contour, and a second end contour, respectively, the outer contour, the first end contour, the second end contour, and a tangent segment connecting the first end contour and the second end contour jointly define a fifth closure curve and a sixth closure curve; the fifth closed curve has a fifth area and the sixth closed curve has a sixth area, and a ratio of the fifth area to the sixth area being in a range of 0.75 to 0.95.

BRIEF DESCRIPTION OF THE DRAWINGS

The present disclosure is further illustrated by way of exemplary embodiments which are described in detail by way of the accompanying drawings. These embodiments are not limiting and in these embodiments the same numbering indicates the same structure where.

DETAILED DESCRIPTION

Figure 1:
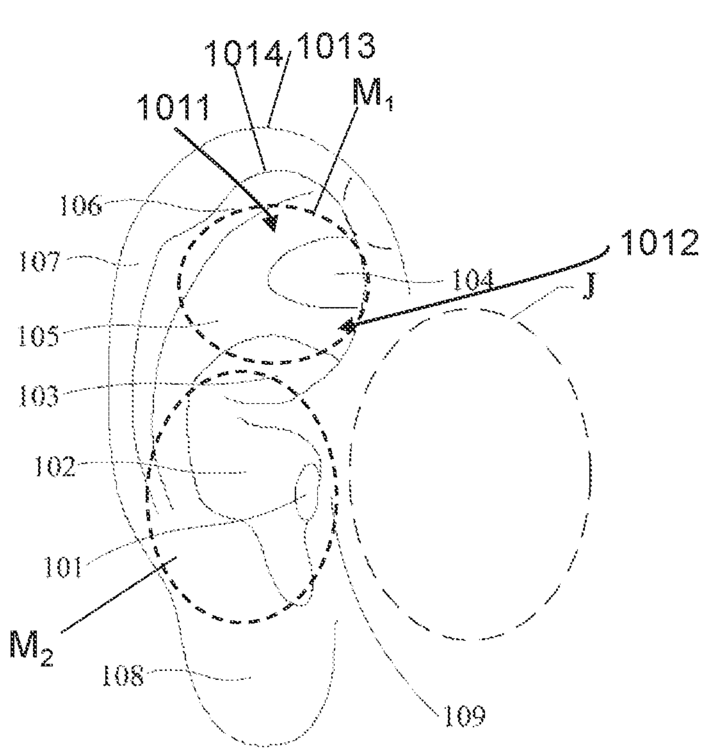
FIG. 1 is a schematic diagram illustrating an exemplary ear according to some embodiments of the present disclosure.

In order to more clearly explain the technical scheme of the embodiment of this description, a brief description of the accompanying drawings required for the embodiment description is given below. Obviously, the accompanying drawings below are only some examples or embodiments of this description, and it is possible for ordinary technicians skilled in the art to apply this description to other similar scenarios according to these accompanying drawings without creative effort. Unless obviously obtained from the context or the context illustrates otherwise, the same numeral in the drawings refers to the same structure or operation.

FIG. 1 is a schematic diagram illustrating an exemplary ear according to some embodiments of the present disclosure.

Referring to FIG. 1, the ear 100 may include an external ear canal 101, an inferior concha 102, a concha boat 103, a triangular fossa 104, an antihelix 105, a scapha 106, a helix 107, an earlobe 108, a helix foot 109, an outer contour 1013, and an inner contour 1014. It should be noted that, for the convenience of description, an upper antihelix crus 1011, a lower antihelix crus 1012 and the antihelix 105 are collectively referred to as an antihelix region in some embodiments of the present disclosure. In some embodiments, one or more parts of the ear 100 may be used to support an acoustic device to achieve a stable wearing of the acoustic device. In some embodiments, parts of the ear 100 such as the external ear canal 101, the inferior concha 102, the concha boat 103, the triangular fossa 104, etc., have a certain depth and volume in a three-dimensional space, which may be used to achieve wearing requirements of the acoustic device. For example, the acoustic device (e.g., an in-ear earphone) may be worn in the external ear canal 101. In some embodiments, the wearing of the acoustic device may be implemented using other parts of the ear 100 than the external ear canal 101. For example, the acoustic device may be worn through the concha boat 103, the triangular fossa 104, the antihelix 105, the scapha 106, the helix 107, or a combination thereof. In some embodiments, the earlobe 108 and other parts of the user's ear may also be used to improve the comfort and reliability of the acoustic device in wearing. By using parts of the ear 100 other than the external ear canal 101 to wear the acoustic device and transmit a sound, the external ear canal 101 of the user's ear may be "liberated". When the user wears an acoustic device (e.g., the open earphone), the acoustic device does not block the user's external ear canal 101 and the user may receive both sounds from the acoustic device and sounds (e.g., sirens, car bells, surrounding people, traffic directions, etc.) from the environment, thus reducing the probability of traffic accidents. In some embodiments, according to a structure of the ear 100, the acoustic device may be designed into a structure adapted to the ear 100, so as to realize a wearing of the sound producer of the acoustic device at different positions of the ear. For example, when the acoustic device is an open earphone, the open earphone may include a suspension structure (e.g., an ear hook) and a sound producer. The sound producer may be physically connected to the suspension structure, which may be adapted to a shape of the ear so as to place the whole or part of the sound producer of the ear on a front side of the helix foot 109 (e.g., the region J enclosed by the dotted line in FIG. 1). As another example, the whole or part of the structure of the sound producer may be in contact with an upper part of the external ear canal 101 (e.g., a position where one or more parts of the helix foot 109, the concha boat 103, the triangular fossa 104, the antihelix 105, the scapha 106, the helix 107, etc., are located) when the user is wearing the open earphone. As another example, when the user wears the open earphone, the whole or part of the structure of the sound producer may be located within a cavity (e.g., a region M1 including at least the concha boat 103 and the triangular fossa 104 and a region M2 containing at least the inferior concha 102 enclosed by the dotted lines in FIG. 1) formed by one or more parts of the ear (e.g., the inferior concha 102, the concha boat 103, the triangular fossa 104, etc.).

Different users may have individual differences, resulting in different shapes, sizes and other dimensional differences of the ears. For ease of description and understanding, if not otherwise specified, the present disclosure primarily uses a "standard" shape and size ear model as a reference and further describes wearing manners of the acoustic device in different embodiments on the ear model. For example, a simulator based on ANSI: S3.36, S3.25 and IEC: 60318-7 containing the head and its (left and right) ear, e.g., GRAS 45BC KEMAR, may be used as a reference for wearing an acoustic device, thus presenting a scenario in which most users wear an acoustic device normally. By way of example only, the ear as a reference may have following relevant features: a projection of the ear on a sagittal plane of the body may be in a range of 1300 $mm^2$ to 1700 $mm^2$. Thus, in the present disclosure, descriptions such as "worn by the user", "in a worn state" and "in a wearing state" may refer to the acoustic device described in the present disclosure being worn on the ear of the aforementioned simulator. Of course, considering individual differences of different users, structures, shapes, sizes, thicknesses, etc., of one or more parts of the ear 100 may be differentiated in design according to ears with different shapes and sizes. These differentiated designs may be expressed as feature parameters of one or more parts of the acoustic device (e.g., the sound production component, the ear hook, etc., hereinafter). The feature parameters may have values in different ranges, so as to adapt to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front and rear direction of the body, which divides the human body into a left part and a right part. The coronal plane may refer to a section perpendicular to the ground along a left and right direction of the body, which divides the human body into a front part and a rear part. The horizontal plane may refer to a section parallel to the ground along an up-and-down direction of the body, which divides the human body into an upper part and a lower part. Correspondingly, the sagittal axis may refer to an axis along the front-and-rear direction of the body and perpendicular to the coronal plane. The coronal axis may refer to an axis along the left-and-right direction of the body and perpendicular to the sagittal plane. The vertical axis may refer to an axis along the up-and-down direction of the body and perpendicular to the horizontal plane. Further, the term "front side of the ear" is used in the present disclosure as opposed to the concept of "rear side of the ear". The front side of the ear is located along the sagittal axis and on the side of the ear facing the facial region of the body, and the rear side of the ear is located along the sagittal axis and on the side of the ear facing away from the facial region of the body. Viewing the ear of the above simulator in the direction in which the coronal axis of the human body is located gives a schematic representation of the anterolateral profile of the ear as shown in FIG. 1.

The description of the ear 100 above is for illustration purposes only and is not intended to limit the scope of the present disclosure. For those of ordinary skill in the art, a wide variety of variations and modifications may be made in accordance with the description of the present disclosure. For example, the portion of the structure of the acoustic device may cover a portion or whole of the external ear canal 101. These changes and modifications remain within the scope of protection of the present disclosure.

Figure 2:
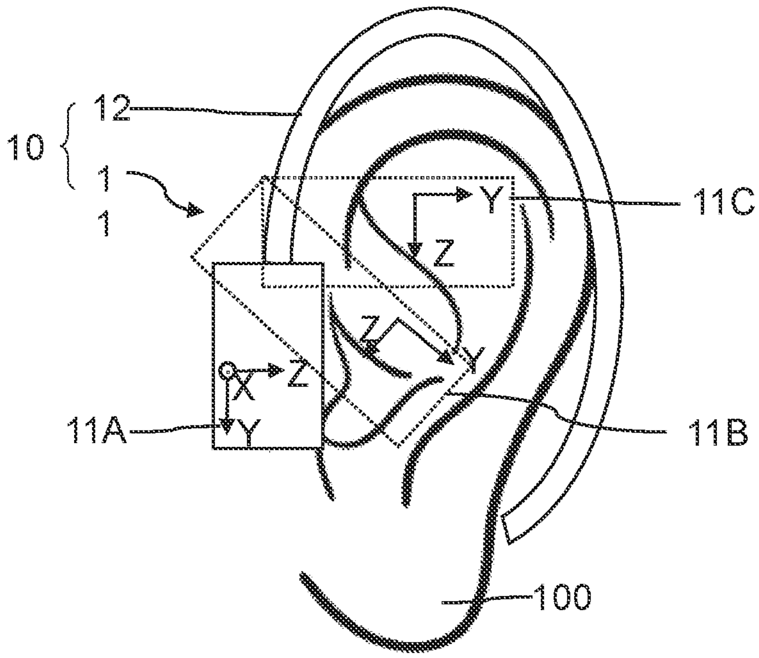
FIG. 2 is a schematic diagram illustrating an exemplary wearing of an open earphone according to some embodiments of the present disclosure.

FIG. 2 is a schematic diagram illustrating an exemplary wearing of an open earphone according to some embodiments of the present disclosure. As shown in FIG. 2, the open earphone 10 may include a sound producer 11 and a suspension structure 12. In some embodiments, the open earphone 10 may be worn on the user's body (e.g., a head, a neck or an upper torso of the human body) through the suspension structure 12 with the sound producer 11. In some embodiments, the suspension structure 12 may be an ear hook. The sound producer 11 is connected to one end of the ear hook, and the ear hook may be set in a shape adapted to the user's ear. For example, the ear hook may be in an arc-shaped structure. In some embodiments, the suspension structure 12 may also be a clamping structure adapted to the user's ear so that the suspension structure 12 may be clamped at the user's ear. In some embodiments, the suspension structure 12 may include, but is not limited to, an ear hook, an elastic band, etc., allowing the open earphone 10 to be well fixed to the user and prevent the user from dropping the open earphone 10 during using the open earphone 10.

In some embodiments, the sound producer 11 may be used to be worn on the user's body and the sound producer 11 may have a speaker therein to produce a sound for input to the user's ear 100. In some embodiments, the open earphone 10 may be combined with products such as glasses, headphones, head-mounted display devices, AR/VR headsets, etc., in which case the sound producer 11 may be fixed in the vicinity of the user's ear 100 by suspension or clamping. In some embodiments, the sound producer 11 may be circular, oval, polygonal (regular or irregular), U-shaped, V-shaped, semi-circular so that the sound producer 11 may be attached directly to the user's ear 100.

In conjunction with FIGS. 1 and 2, in some embodiments, at least a portion of the sound producer 11 may be located above, below, on the front side (e.g., a region J on the front side of the tragus illustrated in FIG. 1) or within the ear (e.g., a region M1 or a region M2 illustrated in FIG. 1) of the user's ear 100 when the user is wearing the open earphone 10. An exemplary description may be given below in conjunction with different wearing positions (11A, 11B and 11C) of the sound producer 11. In some embodiments, the sound producer 11A is located on a side of the user's ear 100 along the sagittal axis towards the facial region of the body, i.e., the sound producer 11A is located in the facial region of the ear 100 towards the body (e.g., the region J illustrated in FIG. 1). Further, a speaker is provided inside the housing of the sound producer 11A, and the housing of the sound producer 11A may be provided with at least one sound guiding hole (not shown in FIG. 2), which may be located on a side wall of the housing towards or near the external ear canal of the user, and the speaker may output a sound to the user's ear canal through the sound guiding hole. In some embodiments, the speaker may include a diaphragm, a cavity inside the housing is separated by the diaphragm into at least a front cavity and a rear cavity, the sound guiding hole is acoustically coupled to the front cavity, the vibration of the diaphragm drives the air in the front cavity to vibrate to produce an air-conduction sound, and the air-conduction sound produced in the front cavity is transmitted to the outside world through the sound guiding hole. In some embodiments, the housing may also include one or more pressure relief holes. The pressure relief holes may be located on a side wall adjacent or opposite to the side wall where the sound guiding hole is located, the pressure relief holes are acoustically coupled to the rear cavity, the vibration of the diaphragm also drives the air in the rear cavity to generate vibration to produce an air-conduction sound, the air-conduction sound generated in the rear cavity may be transmitted to the outside world through the pressure relief holes. Exemplarily, in some embodiments, the speaker within the sound producer 11A may output a sound with a phase difference (e.g., an opposite phase) through the sound output hole and the pressure relief hole, which may be located on the side wall of the housing of the sound producer 11A facing the user's external ear canal 101, and the pressure relief hole may be located on a side of the housing of the sound producer 11 away from the user's external ear canal 101. The housing may act as a baffle to increase a sound range difference between the sound output hole and the pressure relief hole to the external ear canal 101 to increase the intensity of the sound at the external ear canal 101 while reducing a volume of a far-field sound leakage. In some embodiments, the sound producer 11 may have a long-axis direction Y and a short-axis direction Z that are perpendicular to the thickness direction X and orthogonal to each other. The long-axis direction Y may be defined as a direction having a largest extension dimension (e.g., when the projection shape is rectangular or approximately rectangular, the long-axis direction is a length direction of the rectangle or an approximately rectangle) in a shape of a two-dimensional projection plane (e.g., a projection of the sound producer 11 on a plane of an outer side surface of the sound producer 11, or a projection of the sound producer 11 on the sagittal plane) of the sound producer 11. The short-axis direction Z may be defined as a direction perpendicular to the long-axis direction Y in a shape of the projection of the sound producer 11 on the sagittal plane (e.g., when the projection shape is rectangular or approximately rectangular, the short-axis direction is a width direction of the rectangle or the approximately rectangle). The thickness direction X may be defined as a direction perpendicular to the two-dimensional projection plane (e.g., the same direction as the coronal axis that points to the left and right of the body). In some embodiments, when the sound producer 11 is tilted in the wearing state, the long-axis direction Y and the short-axis direction Z remain parallel or approximately parallel to the sagittal plane, the long-axis direction Y may be set at an angle to the sagittal axis direction, i.e. the long-axis direction Y is also set at an angle accordingly, and the short-axis direction Z may be set at an angle to a vertical axis direction, i.e., the short-axis direction Z is also set at an angle, as shown in FIG. 2 for the wearing situation of the sound producer 11B. In some embodiments, the whole or part of the structure of the housing of the sound producer 11B may extend into the inferior concha, i.e., the projection of the housing of the sound producer 11B on the sagittal plane has an overlapping portion with the projection of the inferior concha on the sagittal plane. For more information about the sound producer 11B, please refer to the contents of other parts of the present disclosure, for example, FIG. 3 and the descriptions thereof. In some embodiments, the sound producer may also be horizontal or approximately horizontal in the wearing state, as shown in the sound producer 11C of FIG. 2. The long-axis direction Y may be aligned or approximately aligned with the sagittal axis direction, and points to the front-and-rear direction of the body, and the short-axis direction Z may be aligned or approximately aligned with the vertical axis direction, and points to the up-and-down direction of the body. It should be noted that in the wearing state, the sound producer 11C is in an approximately horizontal state may refer that an angle between the long-axis direction and the sagittal axis of the sound producer 11C shown in FIG. 2 is within a specific range (e.g., no greater than 20°). Furthermore, the wearing position of the sound producer 11 is not limited to the sound producer 11A, the sound producer 11B, and the sound producer 11C shown in FIG. 2, but is sufficient to meet the region J, the region M1, or the region M2 shown in FIG. 1. For example, the whole or part of the structure of the sound producer 11 may be located on a front side of the helix foot 109 (e.g., the region J enclosed by the dotted line in FIG. 1). As another example, the whole or part of the structure of the sound producer may be in contact with an upper part of the external ear canal 101 (e.g., where one or more parts of the helix foot 109, the concha boat 103, the triangular fossa 104, the antihelix 105, the scapha 106, the helix 107, etc., are located). As another example, the whole or part of the structure of the sound producer of the acoustic device may be located within a cavity (e.g., the region M1 containing at least the concha boat 103, the triangular fossa 104 and with the region M2 containing at least the inferior concha 102 enclosed by the dotted lines in FIG. 1) formed by one or more parts (e.g., the inferior concha 102, the concha boat 103, the triangular fossa 104, etc.) of the ear.

In order to improve the stability of the open earphone 10 in the wearing state, the open earphone 10 may be used in any one of the following ways or a combination thereof. For one, at least part of the suspension structure 12 is provided with a profiling structure that fits to at least one of a rear side of the ear and the head to increase a contact area of the suspension structure 12 with the ear and/or the head, thereby increasing the resistance of the acoustic device 10 to dislodging from the ear. Secondly, at least part of the suspension structure 12 is provided with an elastic structure so that it has a certain deformation in the wearing state in order to increase the positive pressure of the suspension structure 12 on the ear and/or the head, thus increasing the resistance of the open earphone 10 to dislodging from the ear. Thirdly, the suspension structure 12 is provided, at least in part, to rest against the ear and/or head in the wearing state so as to create a reaction force that presses against the ear so that the sound producer 11 is pressed against the ear along the coronal axis away from the side of the body's head, thereby increasing the resistance of the open earphone 10 to dislodging from the ear. Fourthly, the sound producer 11 and the suspension structure 12 are set up to clamp the antihelix region, the region where the inferior concha is located, etc., from the front and rear sides of the ear in the wearing state, thus increasing the resistance of the open earphone 10 to dislodging from the ear. Fifthly, the sound producer 11 or the structure connected thereto is provided so as to extend at least partially into the cavities of the inferior concha 102, the concha boat 103, the triangular fossa 104, and the scapha 106, thereby increasing the resistance of the open earphone 10 to dislodging from the ear.

Figure 3:
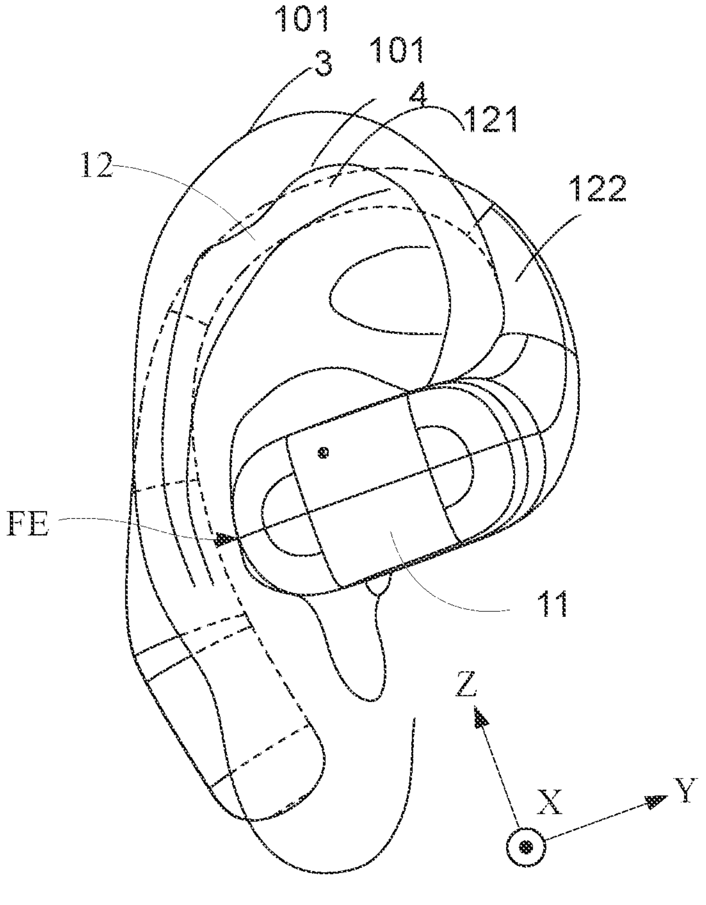
FIG. 3 is a schematic diagram illustrating an exemplary wearing of an open earphone according to some other embodiments of the present disclosure.

Exemplarily, in conjunction with FIG. 3, an end FE (also referred to as a free end) of the sound producer 11 may extend into the inferior concha in the wearing state. Optionally, the sound producer 11 and the suspension structure 12 may be set to jointly clamp the aforementioned ear region from the front and rear sides of the ear region corresponding to the inferior concha, thereby increasing the resistance of the open earphone 10 to dislodging from the ear and thus improving the stability of the open earphone 10 in the wearing state. For example, the end FE of the sound producer is pressed and held in the inferior concha in the thickness direction X. As another example, the end FE abuts in the long-axis direction Y and/or the short-axis direction Z within the inferior concha (e.g., against an inner wall of the opposite end FE of the inferior concha). It should be noted that the end FE of the sound producer 11 refers to an end of the sound producer 11 that is provided opposite a fixed end to which the suspension structure 12 is connected and is also referred to as the free end. The sound producer 11 may be a regular or irregularly shaped structure, and is illustrated here exemplarily to further illustrate the end FE of the sound producer 11. For example, when the sound producer 11 is a rectangular structure, an end wall of the sound producer 11 is flat, in which case the end FE of the sound producer 11 is the end side wall of the sound producer 11 opposite the fixed end to which the suspension structure 12 is attached. As another example, when the sound producer 11 is a sphere, an ellipsoid or an irregular structural body, the end FE of the sound producer 11 may refer to a specific region away from the fixed end obtained by cutting the sound producer 11 along the Y-Z plane (the plane formed by the short-axis direction Z and the thickness direction X), a ratio of a dimension of this specific region along the long-axis direction Y to a dimension of the sound producer along the long-axis direction Y may be in a range of 0.05-0.2.

Figure 4:
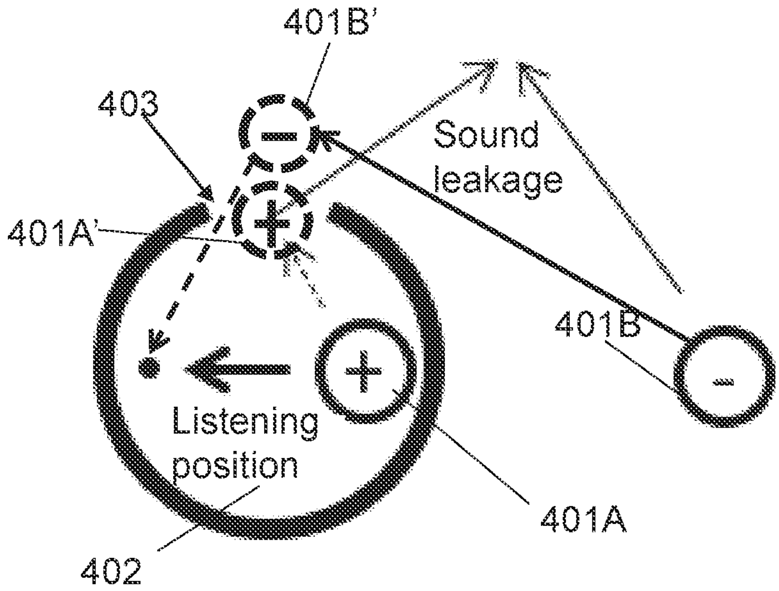
FIG. 4 is a schematic diagram illustrating an acoustic model formed by an open earphone according to some embodiments of the present disclosure.

By extending the sound producer 11 at least partially into the inferior concha, a listening volume at a listening position (e.g., at the ear canal opening) may be increased, especially at low and medium frequencies, while still maintaining a good far-field sound leakage cancellation effect. By way of illustration only, when the whole or part of the structure of the sound producer 11 extends into the inferior concha 102, the sound producer 11, and the inferior concha 102 form a structure similar to a cavity (hereinafter referred to as a cavity-like body), which in the embodiment of the present disclosure may be understood as a semi-enclosed structure enclosed by the side walls of the sound producer 11 jointly with the structure of the inferior concha 102, which is not completely closed off from the external environment but has a leakage structure (e.g., an opening, a gap, a pipeline, etc.) that is acoustically connected to the external environment. When the user wears the open earphone 10, one or more sound guiding holes may be provided on a side of the housing of the sound producer 11 near or towards the user's ear canal, and one or more pressure relief holes are provided on other side walls (e.g., the side walls away from or behind the user's ear canal) of the housing of the sound producer 11. The sound guiding holes is acoustically coupled to the front cavity of the open earphone 10 and the pressure relief holes are acoustically coupled to the rear cavity of the open earphone 10. Taking the sound producer 11 as an example, which includes a sound guiding hole and a pressure relief hole, a sound output from the sound guiding hole and a sound output from the pressure relief hole may be approximated as two sound sources, which are equal in size and opposite in phase. The sound producer 11 and a corresponding inner wall of the inferior concha form a cavity-like structure. A sound source corresponding to the sound guiding hole is located inside the cavity-like structure and a sound source corresponding to the pressure relief hole is located outside the cavity-like structure, thereby forming the acoustic model shown in FIG. 4. As shown in FIG. 4, the cavity-like structure 402 may include a listening position and at least one sound source 401A. The "include" here may indicate that at least one of the listening position and the sound source 401A is inside the cavity-like body structure 402, and the "include" may further refer that at least one of the listening position and the sound source 401A are at an inner edge of the cavity-like body structure 402. The listening position may be equivalent to an entrance to the ear canal, an acoustic reference point in the ear such as an ear reference point (ERP), an ear-drum reference point (DRP), or an entrance structure oriented to the listener, etc. The sound source 401B is located on an outside of the cavity-like structure 402. The sound sources 401A and 401B, which are in opposite phase, output a sound into a surrounding space and interfere with each other to achieve the sound leakage phase cancellation effect. Specifically, as the sound source 401A is surrounded by the cavity-like structure 402, most of the sound output from the sound source reaches the listening position by a direct emission or a reflection. In contrast, without the cavity-like structure 402, most of the sound radiated from the sound source 401A may not reach the listening position. Therefore, the cavity structure makes it possible to significantly increase the volume of the sound reaching the listening position. At the same time, only a small part of the opposite phase sound output from the opposite phase sound source 401B outside the cavity-like structure 402 enters the cavity-like body structure 402 through a leakage structure 403 of the cavity-like structure 402. This is equivalent to generating a secondary sound source 401B' at the leakage structure 403. An intensity of the secondary sound source 401B' is significantly smaller than the sound source 401B, and also significantly smaller than the sound source 401A. A sound produced by the secondary source 401B' has a weak effect of inverse phase cancellation on the sound source 401A in the cavity, resulting in a significant increase in the listening volume at the listening position. For the sound leakage, the sound source 401A outputs a sound to the outside through the leakage structure 402 of the cavity equivalent to the creation of the secondary sound source 401A' at the leakage structure 402. Since almost all the sound radiated by the sound source 401A is output from the leakage structure 403 and a volume of the cavity-like structure 402 is much smaller than a spatial volume for evaluating the sound leakage (a difference of at least one order of magnitude), an intensity of the secondary sound source 401A' may be considered comparable to that of the sound source 401A and still maintains a comparable sound leakage reduction effect.

In specific application scenarios, an outer wall surface of the housing of the sound producer 11 is usually flat or curved, while the contour of the user's inferior concha is uneven, and by extending part or the whole structure of the sound producer 11 into the inferior concha, a cavity-like structure is formed between the sound producer 11 and the contour of the inferior concha that is connected to the outside world. The acoustic model shown in FIG. 4 may be constructed by locating the pressure relief hole at the back or away from the ear canal opening, thereby enabling the user to improve the user's listening position at the ear opening and reduce the sound leakage effect in the far field when wearing the open earphone.

In some embodiments, the sound producer of the open earphone may include a transducer and a housing to accommodate the transducer. The transducer is an element that may receive an electrical signal and convert it into an acoustic signal for output. In some embodiments, differentiated by frequency, a type of transducer may include a low frequency (e.g., 30 Hz~150 Hz) speaker, a low and medium frequency (e.g., 150 Hz~500 Hz) speaker, a high and medium frequency (e.g., 500 Hz~5 kHz) speaker, a high frequency (e.g., 5 kHz~16 kHz) speaker or a full frequency (e.g., 30 Hz~16 kHz) speaker, or any combination thereof. The low frequency, the high frequency, etc., mentioned here only represent an approximate range of the frequency, and in different application scenarios, there may be different division modes. For example, a frequency division point may be determined. The low frequency may represent a frequency range below the frequency division point, and the high frequency may represent frequencies above the frequency division point. The frequency division point may be any value within the audible range of the human ear, for example, 500 Hz, 600 Hz, 700 Hz, 800 Hz, 1000 Hz, or the like.

In some embodiments, the transducer may include a diaphragm. When the diaphragm vibrates, sounds may be emitted from front and back sides of the diaphragm respectively. In some embodiments, the front side of the diaphragm within the housing 120 is provided with a front cavity (not shown) for the transmission of sounds. The front cavity is acoustically coupled with a sound guiding hole, and a sound on the front side of the vibration diaphragm may be emitted from the sound guiding hole through the front cavity. The housing 120 is provided with a rear cavity (not shown) for the transmission of a sound at the rear side of the diaphragm. The rear cavity is acoustically coupled to the pressure relief hole and the sound from the rear side of the diaphragm may be emitted through the rear cavity from the pressure relief hole.

Referring to FIG. 3, the ear hook is illustrated here as an example of the suspension structure 12, in some embodiments the ear hook may include a first portion 121 and a second portion 122 connected in sequence. The first portion 121 may be hung between the user's ear and head and the second portion 122 may extend outwardly of the ear (a side of the ear that is away from the body's head along the coronal axis) and connect the sound producer so as to hold the sound producer in a position near the user's ear canal but without blocking an opening of the ear canal. In some embodiments, the sound guiding hole may be provided in a side wall of the housing towards the ear, thereby transmitting the sound generated by the transducer out of the housing and into the user's ear canal opening.

In some embodiments, the ear hook itself is flexible and a relative position of the sound producer 11 and the ear hook may differ in the wearing and non-wearing states. For example, in order to facilitate wearing and to ensure stability after wearing, a distance between the end FE of the sound producer 11 and the ear hook in the non-wearing state is smaller than a distance between the end FE of the sound producer 11 and the ear hook in the wearing state, so that the sound producer 11 tends to move closer to the ear hook in the wearing state, creating a clamping force on the ear. The wearing and non-wearing states of the open earphone 10 are described separately in the following sections.

In order to facilitate the understanding and description of the form of the open earphone 10 in the non-wearing state or in the wearing state, the open earphone 10 may be projected onto a specific plane and the open earphone 10 may be described by parameters related to a projection shape on that plane. By way of example only, in the wearing state, the open earphone 10 may be projected on the sagittal plane of the body to form a corresponding projection shape. In the non-wearing state, a first plane similar to this may be selected with reference to the relative position of the sagittal plane of the human body in relation to the open earphone 10, such that the projection shape formed by the projection of the open earphone 10 on the first plane is close to the projection shape formed by the projection of the open earphone 10 on the sagittal plane of the human body. For ease of description, with reference to FIG. 6, in some embodiments, the first plane 60 may be determined based on the form of the ear hook when the user is not wearing the open earphone 10. For example, the first plane 60 may be determined by placing the ear hook on a flat support surface (e.g., a horizontal table, a floor plane, etc.), which, when the ear hook is in contact with the support surface and placed smoothly, is the first plane 60 corresponding to the open earphone 10 at this time. In order to maintain a uniform shape of the specific plane corresponding to the wearing and non-wearing states, the first plane 60 may also be a sagittal plane of the human body, where the non-wearing state may be represented by removing the ear structure from a human head model of the user and fixing the sound producer 11 to the human head model in the same posture as in the wearing state using a fixing member or glue. In some embodiments, the first plane 60 may also refer to a plane formed by a line of bisecting or approximately bisecting the ear hook along its length extension.

Figure 6:
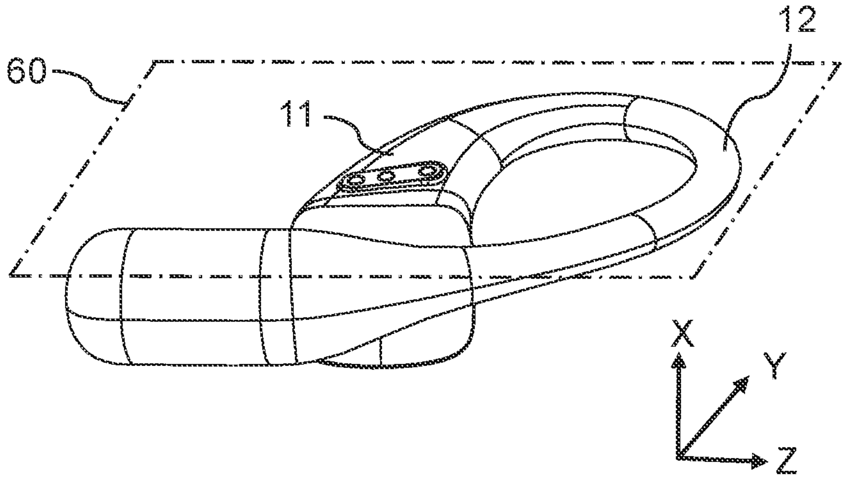
FIG. 6 is a first projection formed by projecting an open earphone in a non-wearing state on a first plane according to some embodiments of the present disclosure.

FIG. 6 is a first projection formed by projecting an open earphone in a non-wearing state on a first plane according to some embodiments of the present disclosure.

Figure 5:
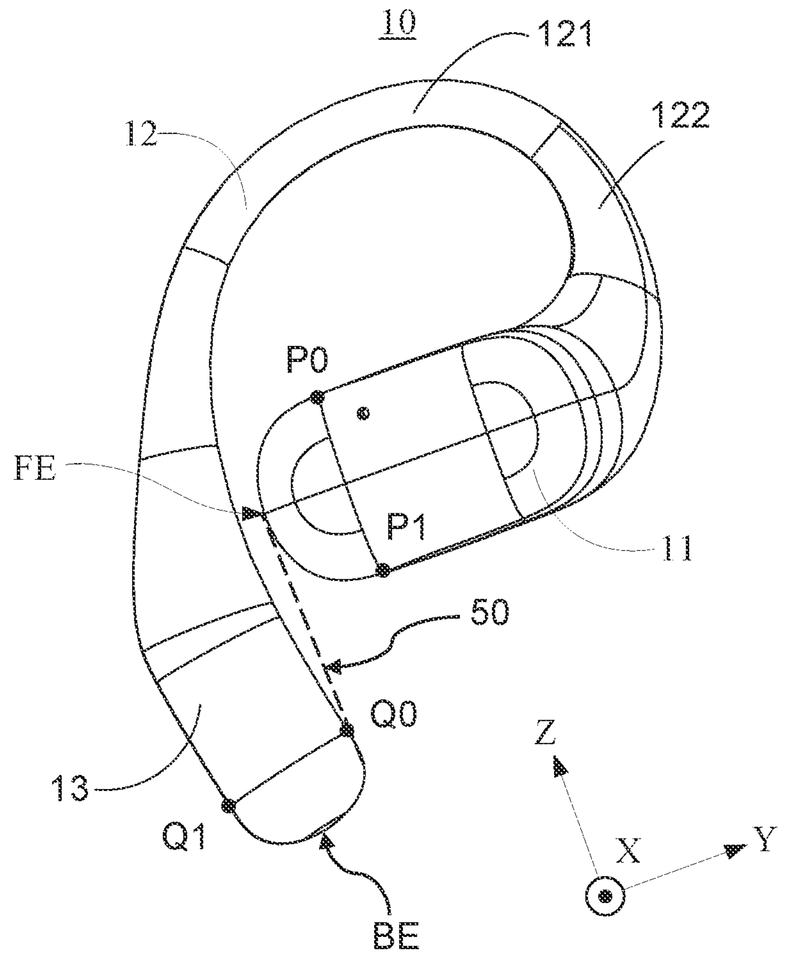
FIG. 5 is a schematic diagram illustrating a structure of an open earphone in a non-wearing state according to some embodiments of the present disclosure.

In conjunction with FIGS. 5 and 6, in some embodiments, the first projection includes an outer contour, a first end contour, an inner contour, and a second end contour. The first end contour may be a projection contour of the end FE of the sound producer 11 on the first plane, two end points P0 and P1 of the first end contour being projection points of the end FE at the junction with the rest of the sound producer 11 on the first plane, the division of the end FE can be seen in the relevant description in FIG. 3 of the present disclosure. The second end contour may be a projection contour of the free end BE of the suspension structure 12 on the first plane, with two endpoints Q0 and Q1 of the second end contour being projection points of the free end BE at the junction with the rest of the suspension structure 12 on the first plane. The outer contour may be a contour where the first projection lies between the point P1 and the point Q1. The inner contour may be a contour where the first projection lies between the point P0 and the point Q0.

It should be noted that the free end BE of the suspension structure 12 may be at least part of a region in an end of the first portion of the suspension structure 12 that is away from the second portion. The end of the first portion of the suspension structure 12 away from the second portion may be a regular or irregularly shaped structure, which is illustrated here exemplarily in order to further illustrate the free end BE of the suspension structure 12. For example, if the first portion of the suspension 12 is a rectangular structure at one end away from the second portion, an end wall thereof is flat, in which case the free end BE of the suspension structure 12 is an end side wall of the first portion of the suspension structure 12 at one end away from the second portion. As another example, when the first portion of the suspension structure 12 at one end away from the second portion is a sphere, an ellipsoid, or an irregular structure, the free end BE of the suspension structure 12 may be a region obtained by extending a specific distance into the second portion in an extension direction of the first portion of the suspension structure 12 from the furthest position away from the second portion, a ratio of this specific distance to the total extension distance of the first portion of the suspension structure 12 may be in a range of 0.05 to 0.2.

Taking the projection of the sound producer 11 on the first plane 60 as a rectangular-like shape (e.g., runway shape), there are parallel or approximately parallel upper and lower side wall projections in the projection of the sound producer 11, and a first end contour connecting the upper and lower side wall projections, the first end contour may be a straight line segment or a circular arc, with points P0 and P1 indicating the two ends of the first end contour respectively. By way of exemplary illustration only, the point P0 may be a junction point between an arc formed by the end FE projection and the line segment of the upper side wall projection and, similarly to the point P0, the point P1 may be a junction point between an arc formed by the end FE projection and the line segment of the lower side wall projection. Similarly, the ear hook has a free end at an end away from the sound producer 11. A projection of the free end of the ear hook on the first plane 60 forms a second end contour, which may be a straight line segment or an arc, with points Q0 and Q1 indicating the two ends of the second end contour respectively. In some embodiments, the points Q0 and Q1 may be two end points of a line segment or arc projected from the free end of the first portion 121 of the ear hook in a direction away from the second portion 122 of the ear hook on the first plane 60, and further, the end point close to the sound producer 11 in the long-axis direction Y of the sound producer 11 is the point Q0 and the end point away from the sound producer 11 is the point Q1.

The shape of the projection of the open earphone 10 on the first plane 60 and the sagittal plane of the human body may reflect the manner in which the open earphone 10 is worn in the ear. For example, the area of the first projection may reflect a region of the ear that can be covered by the open earphone 10 in the wearing state, and the manner in which the sound producer 11 and the ear hook come into contact with the ear. In some embodiments, the inner contour, the outer contour, the first end contour, and the second end contour in the first projection form a non-enclosed region because the sound producer 11 is not in contact with the first portion 121 of the ear hook. A size of this region is closely related to the wearing effect of the open earphone 10 (e.g., a stability of wearing, a sound production position, etc.). For ease of understanding, in some embodiments, a tangent segment 50 connecting the first end contour and the second end contour may be identified and an area enclosed by the first closed curve jointly defined by the tangent segment 50, the outer contour, the first end contour, and the second end contour is taken as the area of the first projection (also referred to as a "first area").

In order to allow the whole or part of the structure of the sound producer 11 to extend into the inferior concha to improve the sound production efficiency of the sound producer 11, the sound production efficiency may be understood as a ratio of a listening volume at the ear canal opening to a sound leakage volume in the far field. The position of the sound producer 11B relative to the ear as shown in FIG. 2 makes it possible to set the size of the sound producer 11 smaller to fit the size of the inferior concha. In addition, in order to provide a suitable clamping force between the first portion 121 of the ear hook and the sound producer 11 at an edge of the inferior concha, and to make the open earphone 10 more stable to wear, a distance between the sound producer 11 and the first portion 121 of the ear hook should not be too far apart in the non-wearing state. Thus, by providing a suitable clamping force, the open earphone 10 is not completely supported by an upper edge of the ear alone in the wearing state, thereby enhancing the wearing comfort. Taking the above into account, the first area enclosed by the first closed curve may be set smaller in the non-wearing state. In some embodiments, a range of the first area enclosed by the first closed curve is not greater than 1500 $mm^2$.

In some embodiments, since the ear hook is at least partially set to rest against the ear and/or head in the wearing state, so that a force that presses against the ear is created. The first area is too small and may cause a foreign body sensation when worn by some people (e.g., people with large ears), so that the first area of the first closed curve is in a range of not less than 1000 $mm^2$, considering the wearing manner and the size of the ear. At the same time, in some embodiments, it is considered that the relative position of the sound producer 11 and the user's ear canal (e.g., the inferior concha) affects a count of leakage structures of the cavity-like structure formed by the sound producer 11 and the user's inferior concha, and the size of the opening of the leakage structure directly affects the quality of the listening sound. The first area is too small, the sound producer 11 may not be able to meet the edge of the inferior concha, thereby resulting in increased sound radiating directly outwards from the sound producer 11 and less sound reaching the listening position, which in turn leads to a reduction in the sound production efficiency of the sound producer 11. In summary, in some embodiments, the first area of the first closed curve may be in a range of 1000 $mm^2$ to 1500 $mm^2$.

In some embodiments, the range of the first area of the first closed curve is not less than 1150 $mm^2$, considering the overall structure of the open earphone 10 and the need to adapt the shape of the ear hook to the space between the ear and the head, etc. In some embodiments, in order to ensure the sound production efficiency of the sound producer 11 and a suitable clamping force, the range of the first area of the first closed curve is not greater than 1350 $mm^2$. Thus, in some embodiments, the first area of the first closed curve may be in a range of 1150 $mm^2$ to 1350 $mm^2$ to ensure the sound production efficiency of the sound producer 11 and the comfort of the user wearing the open earphone 10. At the same time, an appropriate first area ensures the listening volume of the open earphone 10 at the listening position (e.g., at the ear canal opening), especially at low and medium frequencies, and to maintain a good cancellation of far-field sound leakage.

Figure 7:
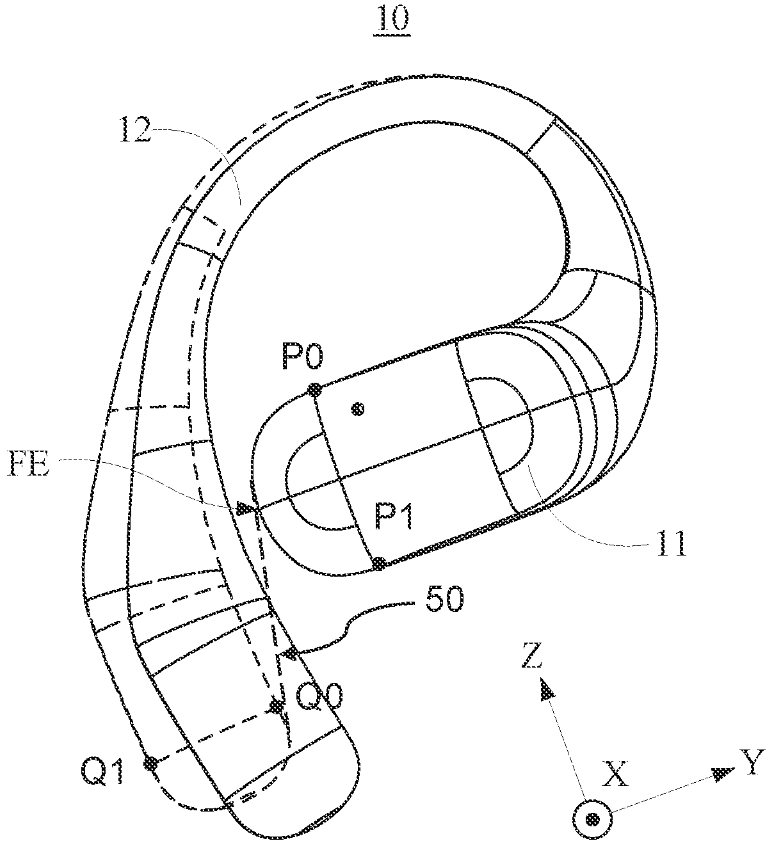
FIG. 7 is a schematic diagram illustrating a morphological difference between an open earphone in a wearing state and in a non-wearing state according to some embodiments of the present disclosure.

FIG. 7 is a schematic diagram illustrating a morphological difference between an open earphone in a wearing state and in a non-wearing state, according to some embodiments of the present disclosure. The dotted region indicates the first portion of the ear hook in the wearing state, which is further away from the end FE of the sound producer than the first portion of the ear hook in the non-wearing state. In the wearing state, the ear hook and the sound producer form a second projection on the sagittal plane of the body, similar to the first projection shown in FIG. 5. The second projection also includes an outer contour, a first end contour, an inner contour, and a second end contour. The outer contour, the first end contour, the second end contour, and a tangent segment connecting the first end contour and the second end contour jointly define a second closed curve. As described above, the shape of the projection formed by the open earphone 10 on the first plane projection is close to the shape of the projection formed by the open earphone 10 in the sagittal projection of the human body, so that in the second projection, the contour boundary points as in FIG. 5, i.e., point P0, point P1, point Q0 and point Q1, may still be used to describe the division of the individual contours in the second projection. That is, the outer contour, the first end contour, the inner contour, and the second end contour and the tangent segment in the second projection are all defined in a similar way to the first contour and are not repeated here. An area enclosed by the second closed curve is considered to be an area of the second projection (also called a "second area"). In some embodiments, the second area may reflect the fit of the open earphone 10 to the user's ear in the wearing state.

Due to the increased distance between the ear hook and the sound producer 11 when the open earphone 10 is worn, the second area enclosed by the second closed curve is larger than the first area enclosed by the first closed curve. In some embodiments, in order to make it possible for the sound producer 11 to reach into the inferior concha in the wearing state and for the ear hook to fit well in the ear, a difference between the second area and the first area may be within a certain range. For example, the second area may be 20 $mm^2$ to 500 $mm^2$ larger than the first area. In some embodiments, the second area may be 50 $mm^2$ to 400 $mm^2$ larger than the first area. In some embodiments, the second area may be 60 $mm^2$ to 100 $mm^2$ larger than the first area.

A too small ratio of the first area to the second area may result in too little clamping force on the user's ear, leading to unstable wear, while a too large ratio of the first area to the second area may result in a less flexible part of the ear hook, making it less user-friendly and causing a foreign body sensation in the ear after wearing. Thus, in some embodiments, a ratio of the first area of the first closed curve to the second area of the second closed curve is in a range of 0.6 to 1. In some embodiments, in order to ensure a good elasticity of the ear hook, the ratio is in a range of 0.75 to 0.95.

For reasons similar to those of the first area, an appropriate second area ensures that the listening volume of the open earphone 10 at the listening position (e.g. at the ear canal opening), particularly at low and medium frequencies, is maintained while maintaining a good cancellation of far-field sound leakage. In some embodiments, the second area is in a range of 1100 $mm^2$ to 1700 $mm^2$. In some embodiments, in order to ensure the sound production efficiency of the sound producer 11 in the inferior concha and the comfort of the user wearing the open earphone 10, the second area may be in a range of 1300 $mm^2$ to 1650 $mm^2$.

In some embodiments, in the wearing state, the sound producer 11 and the first portion of the ear hook clamp the user's ear, and the ear hook generates a clamping force that drives the sound producer 11 closer to the first portion of the ear hook, which needs to be kept within a certain range. It should be noted that the clamping force may be determined by a puller to determine a clamping force corresponding to a preset distance of pulling away, which may be a distance at which the sound producer 11 is pulled away relative to the ear hook in a standard wearing situation; the clamping force may also be obtained by applying a force sensor (e.g., strain gauge) or an array of force sensors to both a side of the ear facing the head and a side of the ear away from the head and reading a value of the force at the position where the ear is clamped. In some embodiments, the clamping force is in a range of 0.03N to 1 N. If the aforementioned clamping force is too low, this may result in the ear hook not being effectively clamped to the front and rear of the ear in the wearing state and a gap between the sound producer 11 and the inferior concha 102 being too large, i.e., a cavity-like opening formed is too large, thereby resulting in an ineffective sound production. If the aforementioned clamping force is too great, it may result in the open earphone 10 feeling strongly pressed against the user's ear in the wearing position, and it is not easy to adjust the wearing position after wearing. In some embodiments, in order to ensure the stability of wearing and comfort for the user's ear, the clamping force is in a range of 0.05N to 0.8N. In some embodiments, the clamping force is in a range of 0.1 N to 0.3N.

Referring again to FIGS. 5 and 6, as before, the wearability of the open earphone 10 may be effectively enhanced by designing a relative size between the first area and the projection area of the ear on the sagittal plane of the human body, considering the differences in the shape and size of the ear of different users. As the shape and size of the ear may vary from user to user, the present disclosure takes an average range of the projection area of the ear on the sagittal plane of the body as a reference. The average range of the projection area is within a range of 1300 $mm^2$ to 1700 $mm^2$. In some embodiments, the ratio of the first area to the projection area of the ear on the sagittal plane of the body in the non-wearing state of the open earphone 10 may be in a range of 0.6 to 0.97, and in some embodiments, the ratio of the first area to the projection area of the ear on the sagittal plane of the body is in a range of 0.7 to 0.95. The ratio of the first area to the projection of the ear on the sagittal plane of the body is within the aforementioned interval, which ensures that the open earphone 10 has a high sound production efficiency and is comfortable to wear. It should be noted that for some users, the projection area of the ear on the sagittal plane of the body may be less than 1300 $mm^2$ or greater than 1700 $mm^2$, in which case the ratio of the first area to the projection area of the ear on the sagittal plane of the body may be greater than 0.95 or less than 0.7. For example, the ratio of the first area to the projection area of the ear on the sagittal plane of the body is in a range of 0.55 to 1.

In order to make it possible for the whole or part of the structure of the sound producer 11 to extend into the inferior concha, for example, the position of the sound producer 11B shown in FIG. 2 relative to the ear and to form the acoustic model shown in FIG. 4 with the user's ear concha cavity, the relative size between the projection area of the sound producer 11 on the first plane 60 and the first area may be set. In some embodiments, the open earphone 10 may be made to have a smaller value of the projection area of the sound producer 11 on the first plane 60 to the first area when not worn, to ensure that the user does not block the user's ear canal opening when wearing the open earphone 10, and also to reduce the load on the user when wearing it, to facilitate the user's daily wear when accessing ambient sound or daily communication. For example, it is possible to make the projection area of the sound producer 11 on the first plane 60 no more than half of the first area (i.e., a ratio is no more than 0.5). In some embodiments, the ratio of the projection area of the sound producer 11 on the first plane 60 to the first area may be within a range of 0.25 to 0.4, thereby reducing the wearing sensation of the user.

As shown in FIG. 5, the first portion 121 of the ear hook includes a battery compartment 13. The battery compartment 13 is provided with a battery electrically connected to the sound producer 11. In some embodiments, the battery compartment 13 is located at an end of the first portion 121 away from the sound producer 11, and the first end contour in the first projection is the projection contour of the free end of the battery compartment on the first plane 60.

In some embodiments, the ear hook has a curved structure that fits into the connection between the human ear and the head, and when the user wears the open earphone 10, the sound producer 11 and the battery compartment 13 may be located on the front and rear sides of the ear, respectively. The end FE of the sound producer 11 extends towards the first portion 121 of the ear hook such that the whole or part of the structure of the sound producer 11 extends into the inferior concha and fits into the side walls of the inferior concha to form a cavity-like structure.

Figure 8:
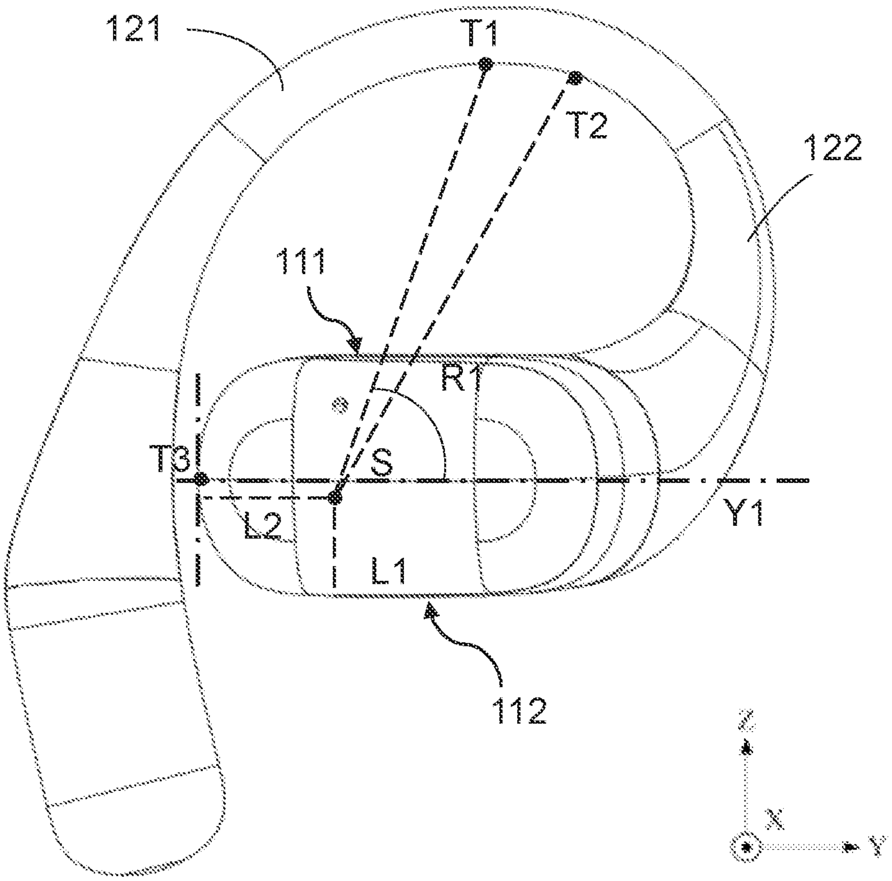
FIG. 8 is a schematic diagram illustrating a mass center of an open earphone according to some embodiments of the present disclosure.

In some embodiments, the battery compartment 13 and the sound producer 11 may form a 'lever' like structure with a pivot point on the ear hook (for example, the polar point T1 of the ear hook in FIG. 8). A size and a weight of the battery compartment 13 should not be so large that it may interfere with the fit of the sound producer 11 to the inferior concha. For example, a ratio of a projection area of the battery compartment 13 on the first plane 60 to the first area may be smaller than the ratio of the projection area of the sound producer 11 on the first plane 60 to the first area, in order to ensure a balanced lever structure and thus a snug fit of the sound producer 11 to the inferior concha when worn. In addition, the size and weight of the battery compartment 13 should not be too small, otherwise it may cause the open earphone 10 to tilt towards the front of the ear when worn, thereby affecting the stability of wearing. In some embodiments, the ratio of the projection area of the battery compartment 13 on the first plane 60 to the first area is in a range of 0.12 to 0.28. In some embodiments, the ratio of the projection area of the battery compartment 13 on the first plane 60 to the first area is in a range of 0.15 to 0.25 to optimize the weight distribution of the open earphone 10 and to ensure that the open earphone 10 remains less likely to fall off even when the user is in strenuous movement.

Referring to FIG. 7, in some embodiments, the size and weight of the battery compartment 13 should not be too large as the second area of the open earphone 10 in the wearing state is larger than the first area in the non-wearing state, and the fit of the sound producer 11 to the inferior concha is otherwise compromised. The size and weight of the battery compartment 13 should also not be too small, otherwise it may cause the open earphone 10 to tilt towards the front side of the ear when worn, thereby affecting the stability of wearing. Therefore, considering the relationship between the first area and the second area, the ratio of the projection area of the battery compartment 13 on the sagittal plane of the human body to the second area of the open earphone 10 in the wearing state is in a range of 0.1 to 0.26. In some embodiments, the ratio of the projection area of the battery compartment 13 on the sagittal plane of the human body to the second area is in a range of 0.13 to 0.23.

Since in the wearing state the sound producer 11 fits into the inferior concha, a too large size of the sound producer 11 may block the ear (e.g., the ear canal opening), while a too small size of the sound producer 11 may lead to increased difficulty in arranging the internal structure of the sound producer 11 (e.g., magnetic circuit, circuit board, etc.). In some embodiments, in order to ensure that the open earphone 10 does not block the user's ear canal opening when the user is wearing the open earphone 10, and also to reduce the load on the user, to facilitate the user's daily wear while accessing ambient sound or daily communication. The ratio of the projection area of the sound producer 11 on the sagittal plane of the body to the second area in the open earphone 10 in the wearing state is in a range of 0.15 to 0.45, and in some embodiments the ratio of the projection area of the sound producer 11 on the sagittal plane of the body to the second area is in a range of 0.2 to 0.35.

In order to ensure that the open earphone 10 has the wearing manner of reaching into the inferior concha and that the sound producer 11 has a high sound production efficiency and is comfortable to wear, and further considering the relationship between the first area and the second area, in some embodiments, the ratio of the second area to the projection area of the ear on the sagittal plane of the human body in the open earphone 10 in the wearing state is in a range of 0.8 to 1.1. It should be noted that the ratio is based on a range of average values of the projection area of the ear on the sagittal plane of the body as a reference, which is in a range of 1300 $mm^2$ to 1700 $mm^2$. For some users, the projection area of the ear on the sagittal plane of the body may be less than 1300 $mm^2$ or greater than 1700 $mm^2$, in which case the ratio of the first area to the projection area of the ear on the sagittal plane of the body may be greater than 1.1 or less than 0.8. For example, the ratio of the second area to the projection area of the ear on the sagittal plane of the body may be within a range of 0.65 to 1.3.

The mass center position of each component, in addition to the projection area of the sound producer 11 and/or the battery compartment on the first plane 60 as described above, is also of greater relevance to the stability of the open earphone 10 when worn.

Referring to FIG. 8, in some embodiments, a distance between the mass center position S of the open earphone 10 and the polar point of the ear hook (e.g., point T1) in the non-wearing state of the open earphone 10 is also relevant for stability when worn and for the foreign body sensation at the position where the user's ear is connected to the head. The polar point of the ear hook may be determined by obtaining the inner contour of the projection curve of the open headset 10 on the sagittal plane of the human body in the wearing state (or the inner contour of the projection of the open headset 10 on the first plane in the non-wearing state) and using the polar point of the inner contour in the short-axis direction Z (e.g., the polar point) as the polar point of the ear hook. The polar point of the inner contour in the width direction Z may be determined by constructing a coordinate system with the long-axis direction Y of the sound producer as the horizontal and vertical and the short-axis direction Z as the vertical axis, and using the polar point of the inner contour of the projection curve on this coordinate system (e.g., with a first order derivative of 0) as the polar point of the inner contour of the projection curve in the width direction Z.

In some embodiments, when the distance between the mass center position S of the open earphone 10 and the polar point T1 of the ear hook is too large, it may occur that the cavity-like structure is affected and leads to unstable wearing due to the poor fit of the sound producer 11 to the inferior concha when worn. Thus, in some embodiments, the distance between the mass center position S of the open earphone 10 and the polar point of the ear hook is not greater than 31 mm. As mentioned above, the open earphone 10 may form a "lever" like structure at the polar point of the ear hook. When the distance between the mass center position S of the open earphone 10 and the polar point of the ear hook is too short, the lever structure is less stable and the open earphone 10 may be unstable when worn. The distance between the mass center position S of the open earphone 10 and the polar point of the ear hook is therefore not less than 24 mm. In summary, in some embodiments, the distance between the mass center position S of the open earphone 10 and the polar point of the ear hook is in a range of 24 mm to 31 mm. It should be noted that, due to the differences in ear size of different users, the distance between the mass center position S of the open earphone 10 and the polar point of the ear hook may be greater than 31 mm in order to fit more users, or the distance may be set less than 24 mm in the open earphone 10 for children or teenagers. For example, the distance between the mass center position S of the open earphone 10 and the polar point of the ear hook may be within a range of 18 mm to 40 mm.

In some embodiments, as shown in FIG. 8, when the sound producer 11 has a rectangular or rectangular-like (e.g., runway-shaped) structure, the sound producer 11 has upper and lower side walls 111 and 112 that are parallel or approximately parallel to each other in the short axis direction. In some embodiments, the mass of the sound producer 11 in the open earphone 10 is influenced by the internal structure of the sound producer 11 (e.g., magnetic circuit, circuit board, etc.) and therefore the mass center position of the open earphone 10 is close to, or influenced by, the mass of the sound producer 11. In order to ensure a good wearing effect of the open earphone 10, it is necessary to design a reasonable relationship between the mass center position S of the open earphone and the sound producer 11. In some embodiments, a distance L1 between the mass center position S of the open earphone 10 and a lower side surface of the sound producer 11 is related to the size of the sound producer in the short-axis direction Z. Too long (or too short) the distance L1 between the mass center position S of the open earphone 10 and the lower side surface of the sound producer 11 may lead to an excessive size of the leakage structure on the cavity-like structure shown in FIG. 4, which in turn has an impact on the sound production efficiency of the sound producer 11. A distance between the mass center position S and the side wall of the sound producer 11 towards or near the user's external ear canal, and the distance between the mass center position S and the sound producer 11 in the long axis direction furthest from the first end contour also affects the sound production efficiency of the sound producer 11. In some embodiments, the distance L1 between the mass center position S of the open earphone 10 and the lower side surface of the sound producer 11 is in a range of 2.5 mm to 6.5 mm in the non-wearing state. In some embodiments, the distance L1 between the mass center position S of the open earphone 10 and the lower side surface of the sound producer 11 is in a range of 3 mm to 5.5 mm. In some embodiments, the distance between the mass center position S of the open earphone 10 and the side wall on the housing of the sound producer 11 towards or near the user's external ear canal (the side of the housing provided with the sound guiding hole hole) is in a range of 2 mm to 8 mm, or, alternatively, a range of 3.5 mm to 6.5 mm. In some embodiments, the furthest distance L2 (e.g., the distance between the mass center position S and the point T3) between the open earphone 10 and the first end contour in the long axis direction is in a range of 1.8 mm to 7 mm, and in some embodiments, the furthest distance L2 between the mass center position S and the first end contour in the long axis direction is in a range of 3 mm to 6 mm.

In some embodiments, a size of an angle R1 between a line connecting the mass center position S of the open earphone 10 and the polar point of the ear hook and the long axis Y1 of the sound producer 11 in the first projection determines to some extent the shape of the inner contour of the open earphone 10, which is related to the user wearing feeling. Specifically, in order to ensure the fit of the ear hook to the user's ear or head when the open earphone 10 is worn, the angle is too large or too small, which may lead to a change in the form when worn, affecting the fit and may not form the cavity-like structure shown in FIG. 4, affecting the sound production efficiency of the sound producer 11, therefore, in some embodiments, the angle R1 between the mass center position S of the open earphone 10 and the polar point of the ear hook and the long axis Y1 of the sound producer 11 in the first projection is in a range of 50° to 90° when the open earphone 10 is not worn, and in some embodiments the angle R1 may be within a range of 55° to 85°.

In some embodiments, the inner contour of the first projection of the open earphone 10 also includes an upper vertex of the ear hook (e.g., point T2). In some embodiments, the upper vertex is the highest point of the inner contour of the open earphone 10 in the vertical axis direction of the body in the wearing state. It should be noted that depending on the shape of the ear and the actual wearing manner of different users, in some cases some of the user's ears may or may not be in contact with the upper vertex and in some embodiments the upper vertex may be close to the polar point. For example, a distance between the upper vertex and the polar point may be less than 15 mm. The upper vertex affects the relative position of the sound producer 11 in the ear when the open earphone 10 is worn. Specifically, when a distance between the mass center position S of the open earphone 10 and the upper vertex T2 of the ear hook is too large, the sound producer 11 may be positioned closer to the user's ear canal opening when the open earphone 10 is worn by the user, and the ear canal opening is then blocked to a certain extent, thereby preventing the connection between the ear canal opening and the external environment, which is not the original design intention of the open earphone 10 itself. When the distance between the mass center position S of the open earphone 10 and the upper vertex T2 of the ear hook is too short, it affects the sound producer 11 reaching into the inferior concha (e.g., causing a large gap between the sound producer 11 and the inferior concha), which in turn affects the sound production efficiency of the sound producer 11. In order to ensure that the open earphone 10 does not block the user's ear canal opening while improving the listening effect of the open earphone 10, in some embodiments, the distance between the mass center position S of the open earphone 10 and the upper vertex of the ear hook is in a range of 20 mm to 38 mm, and in some embodiments, the distance between the mass center position S of the open earphone 10 and the upper vertex of the ear hook is in a range of 25 mm to 32.5 mm.

Figure 9:
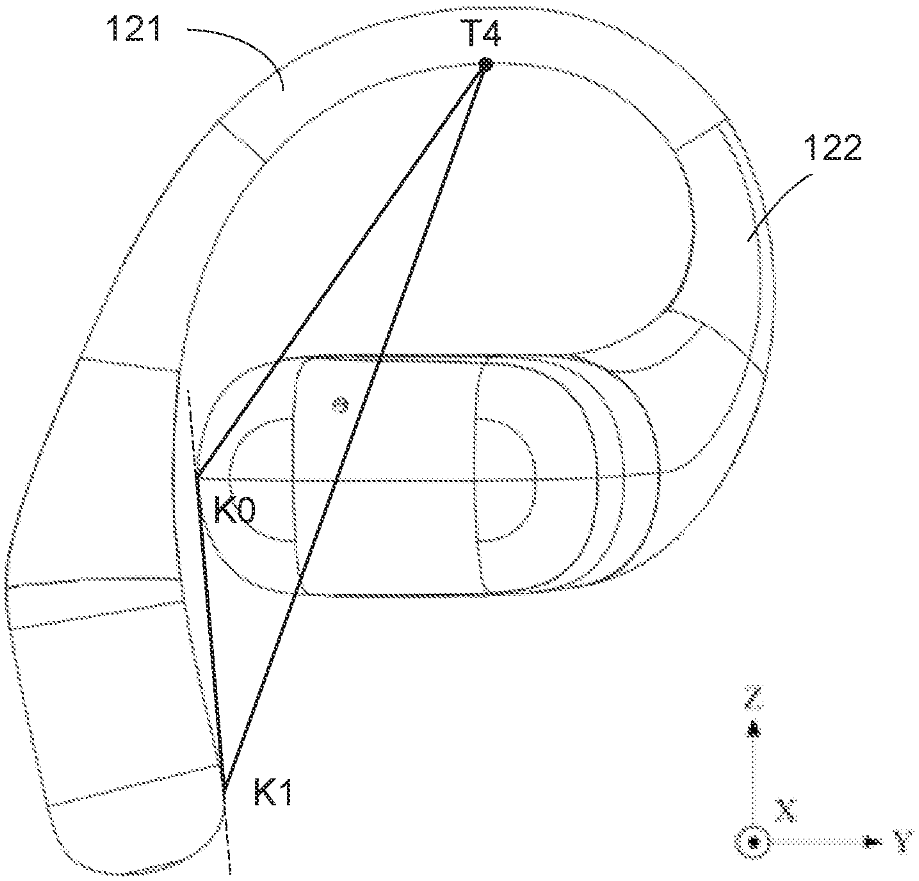
FIG. 9 is a schematic diagram illustrating a tangent segment of a first projection of an open earphone according to some embodiments of the present disclosure.

Referring to FIG. 9, the tangent segment 50 of the first closed curve is defined jointly with the first projection, tangent to the first end contour at a first tangent point K0 and tangent to the second end contour at a second tangent point K1, respectively. Since the position of the first tangent point K0 and the second tangent point K1 is related to the first area of the first closed curve, a change in the area of the triangle formed by the line between the first tangent point K0, the second tangent point K1 and the polar point of the projection of the ear hook on the first plane (e.g. point T4) may lead to a change in the first area, e.g. an increase in the area of the triangle corresponds to a decrease in the first area, which in turn affects the user's wearing experience.

In some embodiments, considering the wearing sensation of the user and the practical range of the first area of the first closed curve, the area of the triangle formed by the first tangent point K0, the second tangent point K1, and the polar point of the projection of the ear hook on the first plane in the open earphone 10 in the non-wearing state is in a range of 110 $mm^2$ to 230 $mm^2$. In some embodiments, the area of the triangle formed by the first tangent point K0, the second tangent point K1, and the polar point projected by the ear hook on the first plane is in a range of 150 $mm^2$ to 190 $mm^2$, so that the first area of the first closed curve is in a range of 1150 $mm^2$ to 1350 $mm^2$.

Referring to FIG. 9, in some embodiments, the first tangent point K0 and the second tangent point K1 are positioned close to the inner and outer sides of the inferior concha where the sound producer 11 and the ear hook are clamped. When the user wears the open earphone 10, the dimension of the line between the first tangent point K0 and the second tangent point K1, i.e., the tangent segment 50, is related to the size of the inferior concha. Therefore, the upper vertex T2, jointly with the first tangent point K0 and the second tangent point K1, may determine the force on the inferior concha of the ear when the user wears the open earphone 10 and is relevant to the user's wearing experience. In some embodiments, the length of the tangent segment 50 is in a range of 11 mm to 25 mm, the distance between the first tangent point K0 and the polar point of the projection of the ear hook on the first plane is in a range of 31 mm to 58 mm, and the distance between the first tangent point K0 and the polar point of the projection of the ear hook on the first plane is in a range of 18 to 41 mm. Too long a segment in the triangle may result in a failure to provide a good clamp on the inferior concha and poor stability of wearing and a tendency to dislodge. Whereas the sound producer 11 and the ear hook are driven by an elastic force to provide proximity to each other, a line segment in the triangle that is too short may cause discomfort when worn with the inferior concha or the ear close to the side of the head, thereby affecting the wearing experience of the open earphone 10. In some embodiments, the length of the tangent segment 50 is in a range of 14 mm to 22 mm. In some embodiments, the distance between the first tangent point K0 of the open earphone 10 in the non-wearing state and the polar point of the projection of the ear hook on the first plane is between 35 mm and 55 mm. In some embodiments, the distance between the first tangent point K0 of the open earphone 10 in the non-wearing state and the polar point of the projection of the ear hook on the first plane is in a range of 22 mm to 38 mm. Furthermore, changes in the length of any line segment of the triangle formed by the upper vertex T2, the first tangent point K0, and the second tangent point K1 lead to changes in the angles of the interior angles of the triangle. For the same reasons as in the previous section, in some embodiments, the angle formed at the first tangent point K0, the second tangent point K1, and the polar point of the projection of the ear hook on the first plane in the triangle formed by the first tangent point K0 is in a range of 17° to 37°, the angle formed at the second tangent point K1 is in a range of 110° to 155° and the angle formed at the polar point of the projection of the ear hook on the first plane is in a range of 9° to 24°. In order to further improve the wearing experience of the user and the stability of wearing, in some embodiments the angle formed at the first tangent point K0 is in a range of 20° to 35°, the angle formed at the second tangent point K1 is in a range of 120° to 150°, and the angle formed at the polar point of the projection of the ear hook on the first plane is in a range of 10° to 22°.

Referring to FIG. 5, in some embodiments, the inner contour, the first end contour, the second end contour, and the tangent segment 50 connecting the first end contour and the second end contour jointly define a third closure curve in the non-wearing state of the open earphone 10. For ease of understanding, similar to the first area, in some embodiments, the tangent segment 50 connecting the first end contour and the second end contour may be determined and the area enclosed by the third closed curve defined by the tangent segment 50, the first end contour and the second end contour jointly as the area of the third projection (also referred to as the "third area"). The third closed curve reflects the fit of the sound producer 11 and the ear hook to the ear when the open earphone 10 is worn. A difference between the first area and the third area is equal to the projection area of the open earphone 10 on the first plane (i.e., the sum of the projection area of the sound producer 11 on the first plane and the projection area of the ear hook on the first plane).

Considering that the relative position of the sound producer 11 and the user's ear canal (e.g., the inferior concha) affects the count of leakage structures in the cavity-like structure formed by the sound producer 11 and the user's inferior concha and the size of the opening of the leakage structure, the size of the opening of the leakage structure directly affects the quality of the listening sound, as the third area is too large, the sound producer 11 may not be able to meet the edge of the inferior concha, thereby resulting in increased sound radiating directly outwards from the sound producer 11 and reduced sound reaching the listening position, which in turn leads to a reduction in the sound production efficiency of the sound producer 11. In some embodiments, the third area of the third closed curve does not exceed 600 $mm^2$, considering the overall structure of the open earphone 10 and the need to adapt the shape of the ear hook to the space between the ear and the head, etc. In some embodiments, too small the third area may lead to too short a distance between the polar point of the ear hook and the sound producer 11, or too much clamping of the ear hook and the sound producer at the user's ear, therefore in some embodiments, the third area is not less than 200 $mm^2$. In summary, in some embodiments, the third area of the third closed curve is in a range of 200 $mm^2$ to 600 $mm^2$. In some embodiments, an excessively large third area may result in a reduced clamping effect between the ear hook and the sound producer 11, when the self-weight of the open earphone 10 is supported by the upper edge of the user's ear, resulting in a reduced wearing sensation, and in order to ensure user wearing comfort, the third area is no greater than 500 $mm^2$. In order to reduce the sound radiated directly outwards by the sound producer 11, to ensure the listening volume of the open earphone 10 in the listening position (e.g., at the ear canal opening) and to improve the comfort of the user when wearing it. In some embodiments, the third area of the third closed curve is in a range of 300 $mm^2$ to 500 $mm^2$.

In some embodiments, the inner contour, the first end contour, the second end contour, and the tangent segment 50 connecting the first end contour and the second end contour jointly define a fourth closed curve in the open earphone 10 in the wearing state. Similarly to the third area, in some embodiments the tangent segment 50 connecting the first end contour and the second end contour may be determined and the area enclosed by the fourth closed curve jointly defined by the tangent segment 50, the first end contour and the second end contour as the area of the fourth projection (also referred to as the "fourth area"). A difference between the fourth closed curve and the third closed curve reflects the fit of the sound producer 11 and the ear hook to the ear when the open earphone 10 is worn.

In some embodiments, due to an elasticity of the ear hook, the distance between the ear hook and the sound producer 11 increases in the wearing state, so that the fourth area formed by the open earphone 10 in the wearing state is larger than the third area formed in the non-wearing state. In some embodiments, when the fourth area is too large, the sound producer 11 may not be able to meet the edge of the inferior concha, resulting in increased sound radiating directly outwards from the sound producer 11 and less sound reaching the listening position, which in turn leads to a reduction in the sound production efficiency of the sound producer 11. In some embodiments, the fourth area of the fourth closed curve does not exceed 900 $mm^2$, considering the overall structure of the open earphone 10 and the need to adapt the shape of the ear hook to the space between the ear and the head, etc. In some embodiments, too small the fourth area may lead to too short the distance between the polar point of the ear hook and the sound producer 11, or too much clamping of the ear hook and the sound producer at the user's ear, therefore in some embodiments the fourth area is not less than 350 $mm^2$.

In some embodiments, the fourth area of the fourth closed curve is in a range of 350 $mm^2$ to 900 $mm^2$. In some embodiments, an excessively large fourth area may result in a reduced clamping effect between the ear hook and the sound producer 11, when the self-weight of the open earphone 10 is supported by the upper edge of the user's ear, resulting in a reduced wearing experience. In order to ensure the comfort of the user and to ensure the listening volume of the open earphone 10 in the listening position (e.g., at the ear canal opening) and to improve the comfort of the user when wearing it, in some embodiments the fourth area of the fourth closed curve is in a range of 450 $mm^2$ to 750 $mm^2$.

Too small a ratio of the third area to the fourth area may result in too little clamping force on the user's ear, which may lead to unstable wear, while too large the ratio of the third area to the fourth area may result in a less flexible part of the ear hook, which may not be easy for the user to wear and may cause a foreign body sensation in the ear after wearing. Thus, in some embodiments, the ratio of the third area of the third closed curve to the fourth area of the fourth closed curve is in a range of 0.5 to 0.85 in order to ensure a proper elasticity of the ear hook. In some embodiments, in order to further improve the fit of the sound producer 11 and the ear hook to the ear, and to increase the stability of the open earphone when worn, the ratio of the third area to the fourth area is in a range of 0.59 to 0.77.

Figure 10:
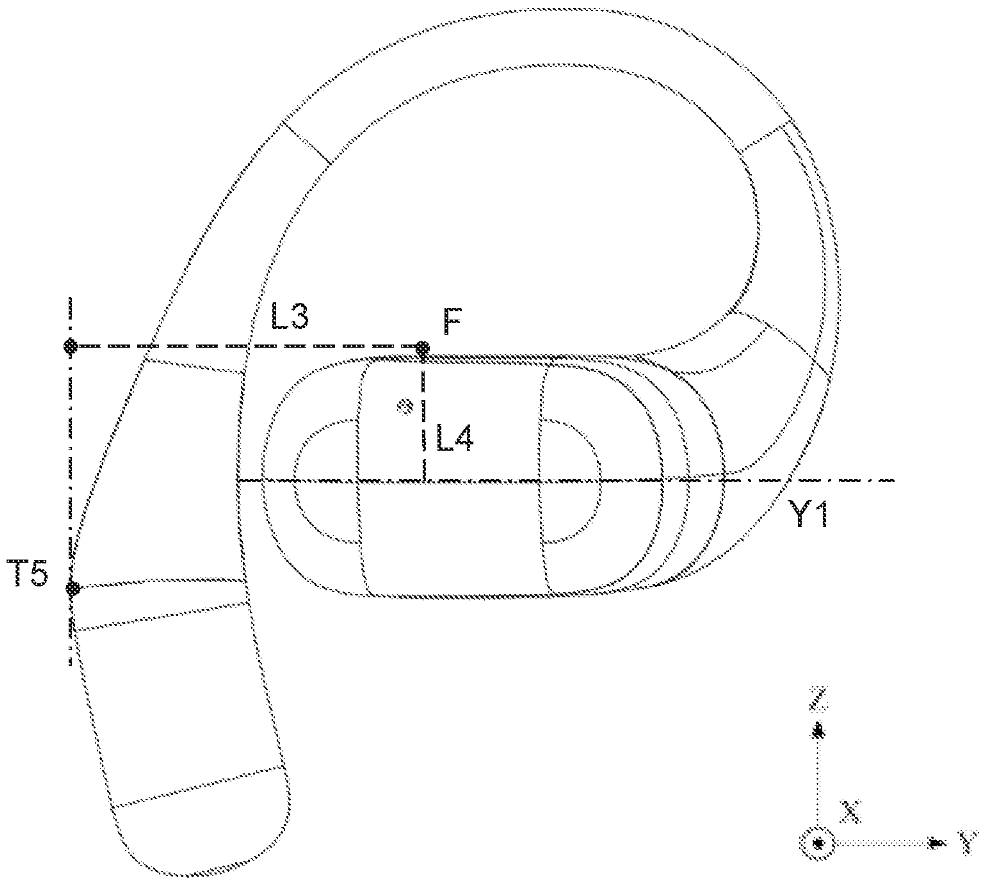
FIG. 10 is a schematic diagram illustrating a mass center of an ear hook of an open earphone according to some embodiments of the present disclosure.

Referring to FIG. 10, in some embodiments, the weight distribution of the ear hook needs to be considered in order to ensure comfort when wearing the open earphone 10. In order to reduce the pressure on the ear by the pivot point of the ear hook (e.g., the polar point or the upper vertex), the mass center position of the ear hook (e.g., point F) may be set near the sound producer 11. In this way, after the sound producer 11 has been extended into the inferior concha, the inferior concha may support part of the weight of both the sound producer 11 and the ear hook, reducing the pressure on the ear by the pivot point of the ear hook. The mass of the ear hook described here refers to a mass of the ear hook as a whole (including the battery compartment 13 but excluding the sound producer 11). As shown in FIG. 10, point T5 is a point at which the outer contour of the first projection lies at the extreme end in the long axis direction of the sound producer 11. In some embodiments, considering a weight relationship between the ear hook and the sound producer 11, a distance L3 between the mass center position of the ear hook and the point T5 in the long axis direction of the sound producer 11 is in a range of 22 mm to 49 mm. In some embodiments, in order to make the mass center position of the ear hook close to the contact area with the edge of the inferior concha on the sound producer 11 (for well support of the ear hook by the inferior concha), the distance L3 between the mass center position of the ear hook and the point T5 is between 25 mm and 25 mm.

The mass center position of the ear hook may also be related to the shape of the ear hook. In some embodiments, if the mass center position of the ear hook in the non-wearing state is too large in relation to a shortest distance L4 of the long axis Y1 of the sound producer 11 in the short axis direction of the sound producer 11, the distance between the polar point of the ear hook and the sound producer 11 increases, which may lead to unstable wearing of the open earphone 10, and at the same time, the distance between the mass center position of the ear hook and the inferior concha in the wearing state increases, which is not conducive to the support of the ear hook by the inferior concha; if the distance L4 between the mass center position of the ear hook and the long axis Y1 of the sound producer 11 in the short axis direction of the sound producer 11 is too short, the ear hook (e.g., the first portion) may cause friction on the position between the user's ear and head during wearing, resulting in a feeling of pressure or foreign body. Thus, in some embodiments, the distance L4 between the mass center position of the ear hook and the long axis Y1 of the sound producer 11 in the short axis direction of the sound producer 11 is in a range of 3 mm to 13 mm. In some embodiments, the distance L4 between the mass center position of the ear hook and the long axis Y1 of the sound producer 11 in the short axis direction of the sound producer 11 is in a range of 4 mm to 11 mm.

Figure 11:
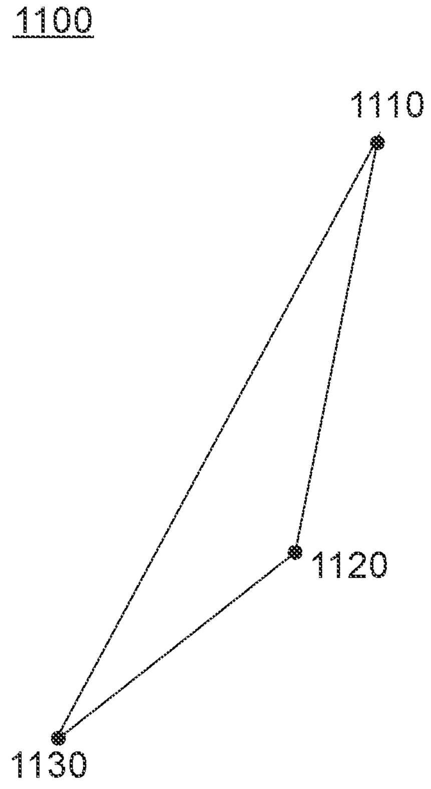
FIG. 11 is a schematic diagram illustrating a triangle formed by a mass center of an ear hook, a battery compartment and a sound producer of an open earphone according to some embodiments of the present disclosure.

Referring to FIG. 11, the three vertices of the triangle 1100 in the figure correspond to the mass 1110 of the ear hook of the open earphone 10, the mass 1120 of the sound producer and the mass 1130 of the battery compartment. The aforementioned triangle 1100 formed by the three masses affects the stability and comfort of the open earphone 10 when worn, and in addition, the distribution of the three masses also has an impact on the position of the mass of the open earphone 10. A long line segment in the triangle 1100 may lead to poor stability when wearing the open earphone 10, for example, a distance between the mass 1130 of the battery compartment and the mass 1110 of the ear hook is too short, which may lead to a tendency for the open earphone 10 to tilt towards the position of the sound producer 11 when wearing the open earphone 10, with the extension of wearing time or the movement of the user when wearing the open earphone 10, the sound producer 11 may tilt to a certain extent or even fall off, affecting the wearing experience of the user. The distance between the mass of the battery compartment 1130 and the mass of the ear hook 1110 is too long, which may lead to a tendency for the open earphone 10 to tilt towards the position of the battery compartment 13 when worn, and with the extension of the wearing time or the movement of the user when wearing the open earphone 10, the sound producer 11 may also produce a certain tilt set or even fall off, affecting the wearing experience of the user. Considering the stability of wearing, in some embodiments, the relative distance between the mass center 1120 of the sound producer and the mass center 11 of the ear hook is in a range of 15 mm to 40 mm in the non-wearing state of the open earphone 10; in the non-wearing state of the open earphone 10, the relative distance between the mass center 1130 of the battery compartment and the mass center 11 of the ear hook is in a range of 40 mm to 62 mm; the relative distance between the mass center 1120 of the sound producer and the mass center 1130 of the battery compartment is in a range of 11 mm to 35 mm. In some embodiments, in order to further improve the comfort of the user wearing the open earphone 10, the relative distance between the mass center 1120 of the sound producer and the mass center 11 of the ear hook in the open earphone 10 in the non-wearing state is in a range of 20 mm to 35 mm; in the non-wearing state of the open earphone 10, the relative distance between the mass center 1130 of the battery compartment and the mass center 11 of the ear hook is in a range of 35 mm to 55 mm; the relative distance between the mass center 1120 of the sound producer and the mass center 1130 of the battery compartment is in a range of 15 mm to 30 mm.

In some embodiments, variations in the length of any line segment (the distance between the two masses) in the triangle 1100 formed by the mass 11 of the ear hook, the mass 1120 of the sound producer and the mass 1130 of the battery compartment may result in angular variations in the inner corners of the triangle 1100, which in turn may have an impact on the actual wearing experience of the open earphone 10. For example, a too large angle or a too small angle formed at the mass 1120 of the sound producer in the triangle 1000 may result in variations in the lever structure formed by the sound producer 11 and the ear hook as previously mentioned, thereby affecting the wearing experience of the user. For reasons similar to those in the preceding paragraph, in some embodiments, the open earphone 10, in the non-wearing state, has the triangle 1000 formed by the line connecting the mass center 1120 of the sound producer, the mass center 11 of the ear hook, and the mass center 1130 of the battery compartment as vertices. In the triangle 1000, the angle formed at the mass center 1130 of the battery compartment is in a range of 12° to 22°, the angle formed at the mass center of the sound producer is in a range of 111° to 164°, and the angle formed at the mass center 11 of the ear hook is in a range of 11° to 24°. In some embodiments, the angle formed at the mass center 1130 of the battery compartment in the triangle 1100 is in a range of 15° to 25°, the angle formed at the mass center of the sound producer is in a range of 130° to 160°, and the angle formed at the mass center 11 of the ear hook is in a range of 12° to 22°.

Figure 12:
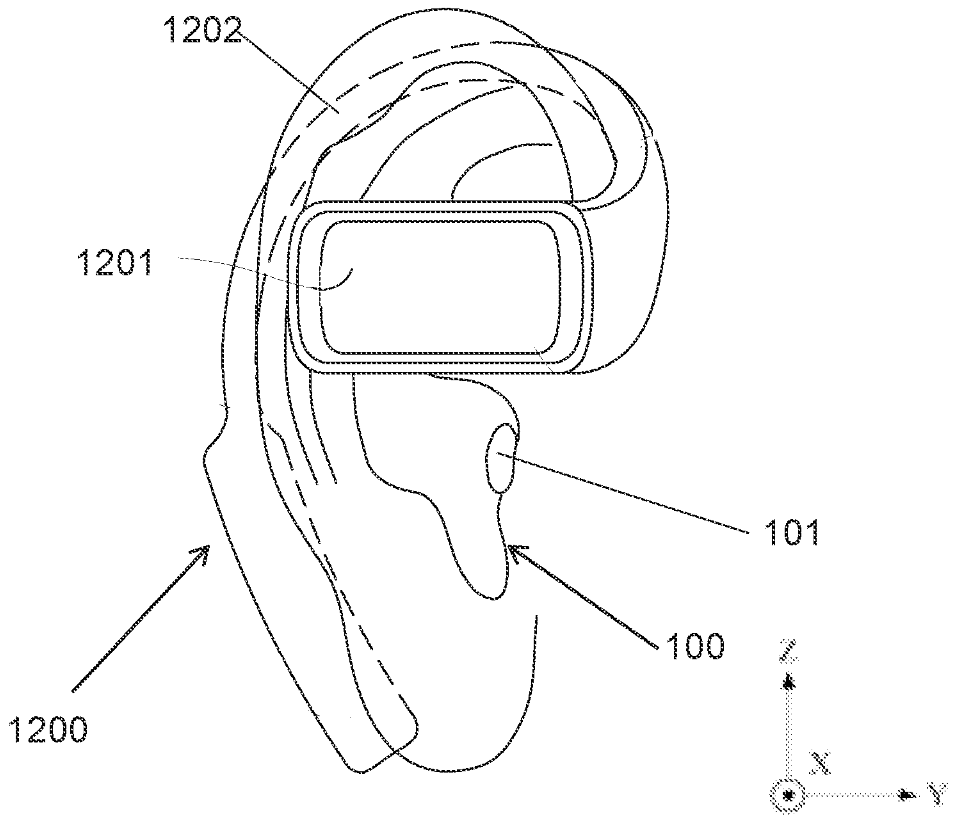
FIG. 12 is a schematic diagram illustrating an exemplary wearing of an open earphone according to some other embodiments of the present disclosure.

In some embodiments, as previously described, the sound producer may have alternative ways of being worn that differ from extending into the inferior concha. The open earphone 1200 shown in FIG. 12 is described in detail below as an example of the open earphone 1200. It should be known that the structure of the open earphone 1200 of FIG. 12 and its corresponding parameters may also be equally applicable to the open earphone 1200 mentioned above in which the sound producer is extended into the inferior concha, without violating the corresponding acoustic principles.

Figure 13:
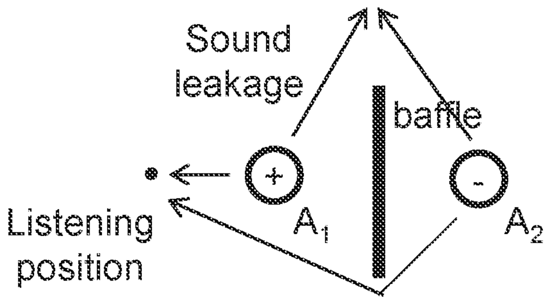
FIG. 13 is a schematic diagram illustrating an acoustic model formed by an open earphone according to some other embodiments of the present disclosure.

By locating the sound producer 1201 at least partially at the user's antihelix 105, the output of the open earphone 1200 may be increased, i.e., the sound intensity in the near-field listening position is increased while the volume of the far-field leakage is reduced. When the user is wearing the open earphone 1200, one or more sound guiding holes may be provided on the side of the housing of the sound producer 1201 near or towards the user's ear canal, and one or more pressure relief holes are provided on other side walls of the housing of the sound producer 1201 (e.g., the side walls away from or behind the user's ear canal), with the sound guiding holes acoustically coupled to the front cavity of the open earphone 1200 and the pressure relief holes acoustically coupled to the rear cavity of the open earphone 1200. Taking the example of the sound producer 1201 including a sound guiding hole and a pressure relief hole, a sound output from the sound guiding hole and a sound output from the pressure relief hole may be approximated as two sound sources, which are equal in size and opposite in phase. The sound emitted from the sound guiding hole may be transmitted unimpeded directly to the user's ear canal opening, whereas the sound emitted from the pressure relief hole needs to bypass the housing of the sound producer 1201 or pass through the sound producer 1201 to form an acoustic model similar to that shown in FIG. 13. As shown in FIG. 13, when there is a baffle between point sound source A1 and point sound source A2, in the near field, a sound field of point sound source A2 needs to go around the baffle in order to interfere with a sound wave of point sound source A1 at the listening position, which corresponds to an increase in the sound range from point sound source A2 to the listening position. Assuming that the point sound source A1 and the point sound source A2 have the same amplitude, an amplitude difference between the sound waves of the point sound source A1 and that of the point sound source A2 at the hearing position may be larger than that in a case without a baffle, thereby reducing a sound cancellation of the two sounds at the hearing position, and increasing a sound volume at the hearing position. In the far-field, the sound waves generated by the point sound source A1 and the point sound source A2 may not bypass the baffle in a relatively large space, and the sound waves may be interfered (as a case without the baffle). Compared to the case without the baffle, the sound leakage in the far-field may not increase significantly. Therefore, a baffle structure around one of point sound source A1 and point sound source A2 may significantly increase the volume at the near-field listening position without significantly increasing the volume of sound leakage in the far field.

Figure 14:
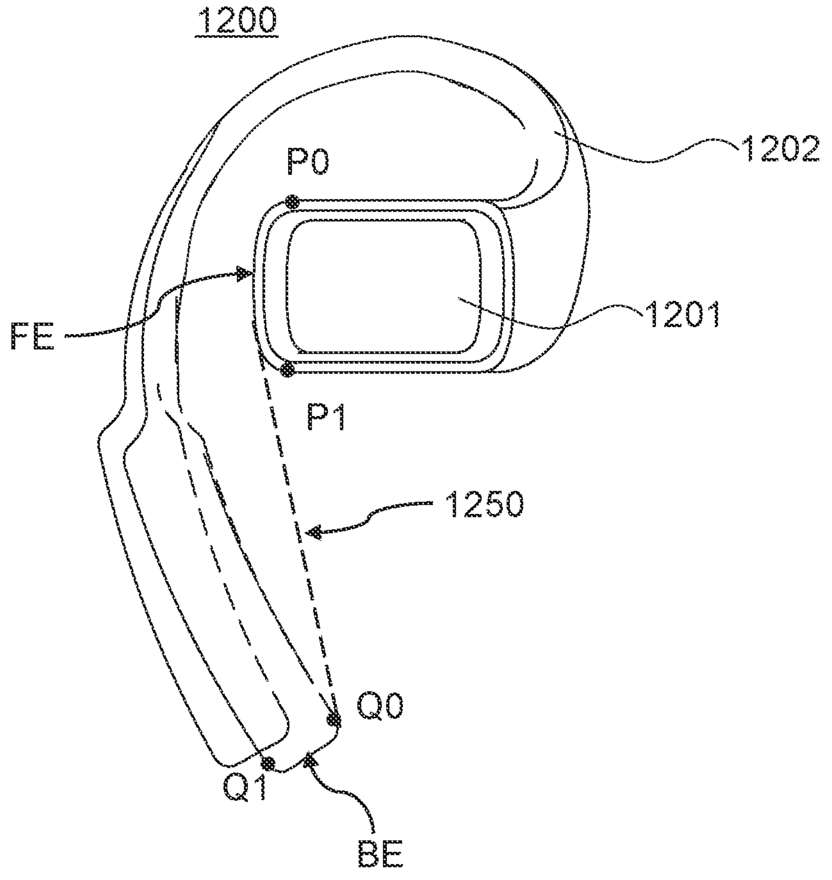
FIG. 14 is a schematic diagram illustrating a morphological difference between an open earphone in a wearing state and a non-wearing state, according to some embodiments of the present disclosure.

As shown in FIG. 14, the ear hook 1202 and the sound producer 1201 form a fifth projection on the first plane, the fifth projection including an outer contour, a first end contour, an inner contour, and a second end contour. Similar to the open earphone 10 structure in FIG. 3, the first end contour in the fifth projection may be a projection contour of the end FE of the sound producer 1201 on the first plane, with two endpoints P0 and P1 of the first end contour being the projection points of the end FE at the junction with the rest of the sound producer 1201 on the first plane. The second end contour may be a projection contour of the free end BE of the suspension structure 1202 on the first plane, with the two end points Q0 and Q1 of the second end contour being the projection points of the free end BE at the junction with the rest of the suspension structure 12 on the first plane. The outer contour may be a contour where the first projection lies between the point P1 and the point Q1. The inner contour may be a contour where the fifth projection lies between the points P0 and Q0. For more information about the division of the end FE and the free end BE of the suspension structure 1202, please refer to the relevant description of the open earphone 10 (as described in relation to FIG. 3 and FIG. 5 of the present disclosure).

Taking the projection of the sound producer 1201 on the first plane as a rectangle-like (e.g., runway-shaped), there are parallel or approximately parallel upper and lower side wall projections in the projection of the sound producer 1201, and the first end contour connecting the upper and lower side wall projections, the first end contour may be a straight line segment or a circular arc, with points P0 and P1 indicating the two ends of the first end contour respectively. By way of example only, the point P0 may be a junction point between an arc formed by the projection of the free end of the sound producer 1201 and a line segment of the upper side wall projection, and similarly to the point P0, the point P1 may be a junction point between an arc formed by the projection of the free end of the sound producer 1201 and a line segment of the lower side wall projection. Similarly, the ear hook 1202 has a free end at one end away from the sound producer 1201, and the projection of the free end of the ear hook 1202 on the first plane 60 forms a second end contour, which may be a straight line segment or an arc. The points Q0 and Q1 indicate the two ends of the second end contour respectively. In some embodiments, the points Q0 and Q1 may be two endpoints of a line segment or arc of the projection of the free end of the first portion of the ear hook 1202 in the direction away from the second portion of the ear hook on the first plane 60, and further, the end point close to the sound producer 11 in the long-axis direction Y of the sound producer 11 is point Q0 and the end point away from the sound producer 11 is Q1.

As shown in FIG. 14, the projection shape of the open earphone 1200 on the first plane and on the sagittal plane of the human body may reflect the manner in which the open earphone 1200 is worn in the ear. For example, the area of the first projection may reflect an area of the ear that may be covered by the open earphone 1200 in the wearing state, and the way in which the sound producer 1201 and the ear hook 1202 are in contact with the ear. In some embodiments, the inner contour, the outer contour, the first end contour, and the second end contour in the first projection form a non-enclosed region because the sound producer 1201 is not in contact with the first portion of the ear hook 1202. The size of this region is closely related to the wearing effect of the open earphone 1200 (e.g., stability of wearing, sound production position, etc.). For ease of understanding, in some embodiments, a tangent segment 1250 connecting the first end contour and the second end contour may be determined, and the area enclosed by the fifth closed curve jointly defined by the tangent segment 1250, the outer contour, the first end contour, and the second end contour is the area of the fifth projection (also referred to as the "fifth area").

In some embodiments, the open earphone 1200 differs from the open earphone 10 shown in FIG. 5 in that the sound producer 1201 of the open earphone 1200 is located at the user's antihelix 105 in the wearing state, so that the fifth area is smaller in extent than the first area. In some embodiments, the fifth area may be 0.2 times to 0.6 times the first area. In some embodiments, the fifth area may be 0.3 times to 0.5 times the first area. The fifth area of the fifth closed curve may be in a range of 250 $mm^2$ to 1000 $mm^2$. In order to ensure the sound production efficiency of the sound producer 1201 and a moderate clamping force and to avoid the foreign body sensation generated by the open earphone 1200 when worn, the fifth area of the fifth closed curve is in a range of 400 $mm^2$ to 800 $mm^2$.

FIG. 14 is a schematic diagram illustrating a morphological difference between an open earphone in a wearing state and a non-wearing state, according to some embodiments of the present disclosure. The dotted region indicates the first portion of the ear hook in the wearing position, which is further away from the free end of the sound producer than the first portion of the ear hook in the non-wearing state. In the wearing state, the ear hook 1202 and the sound producer 1201 form a sixth projection on the sagittal plane of the body, similar to the fifth projection shown in the figure, the sixth projection also includes an outer contour, a first end contour, an inner contour, and a second end contour. The outer contour, the first end contour, the second end contour, and the tangent segment 1250 connecting the first end contour and the second end contour jointly define a second closed curve. As described above, the projection shape formed by the open earphone 1200 on the first plane projection is close to the projection shape formed by the open earphone 1200 in the sagittal projection of the human body, so that in the sixth projection, the contour boundary points, i.e., point P0, point P1, point Q0 and point Q1, in the non-wearing state, can still be used to describe the division of the individual contours in the second projection. That is, the outer contour, the first end contour, the inner contour, the second end contour, and the tangent segment 1250 in the sixth projection are all defined in a similar way to the fifth contour and are not repeated here. The area enclosed by the sixth closed curve is considered to be the area of the sixth projection (also known as the "sixth area"). In some embodiments, the sixth area may reflect the fit of the open earphone 1200 to the user's ear in the wearing state.

A too large ratio of the fifth area to the sixth area may result in too weak clamping force on the user's ear, which may lead to unstable wear, while too small the ratio of the fifth area to the sixth area may result in a less flexible part of the ear hook, which may not be easy for the user to wear and may cause a foreign body sensation in the ear after wearing. Thus, in some embodiments, the ratio of the fifth area to the sixth area is in a range of 0.6 to 0.98 in order to ensure proper elasticity of the ear hook 1202, and in some embodiments, the ratio of the fifth area to the sixth area is in a range of 0.75 to 0.95.

For reasons similar to the fifth area, an appropriate sixth area ensures that the open earphone 1200 can be listened to at a good volume at the listening position (e.g., antihelix), while maintaining a good cancellation of far-field sound leakage. In some embodiments, the sixth area is in a range of 400 $mm^2$ to 1100 $mm^2$. In some embodiments, the sixth area is in a range of 500 $mm^2$ to 900 $mm^2$ considering the elasticity of the ear hook 1202.

In some embodiments, in order to ensure that the user wears the open earphone 1200 with the sound producer 1201 close to the antihelix position, but also to reduce the load on the user while wearing it and to facilitate the user's daily wear when accessing ambient sound or daily communication, in some embodiments, a ratio of the projection area of the sound producer 1201 on the sagittal plane of the human body to the fifth area is in a range of 0.3 to 0.85, and the ratio of the projection area of the sound producer 1201 on the sagittal plane of the human body to the fifth area is in a range of 0.4 to 0.75. For reasons similar to the fifth area, an appropriate ratio of the projection area of the sound producer 1201 on the sagittal plane of the human body to the sixth area may reduce the load on the user while wearing the open earphone 1200. In some embodiments, the ratio of the projection area of the sound producer 1201 on the sagittal plane of the human body to the sixth area in the wearing state is in a range of 0.25 to 0.9, and the ratio of the projection area of the sound producer 1201 on the sagittal plane of the human body to the sixth area is in a range of 0.35 to 0.75.

Considering the differences in the shape and size of different users' ears, the relative size between the fifth and sixth areas and the projection of the ear contour on the sagittal plane of the human body may be designed to effectively enhance the wearing effect of the open earphone 1200. In some embodiments, a ratio of the fifth area of the open earphone 1200 to the projection of the ear contour on the sagittal plane of the body in the non-wearing state is in a range of 0.25 to 0.5; in the wearing state of the open earphone 1200, the ratio of the sixth area to the projection of the ear on the sagittal plane of the body is in a range of 0.3 to 0.5. A ratio of the fifth and sixth area to the projection of the ear on the sagittal plane of the body within the aforementioned interval ensures that the open earphone 1200 has a high sound production efficiency and the open earphone 1200 is comfortable to wear. It should be noted that the ratio is based on a range of average values for the projection area of the ear on the sagittal plane of the body as a reference, which is in a range of 1300 $mm^2$ to 1700 $mm^2$. For some users, the projection area of the ear on the sagittal plane of the body may be less than 1300 $mm^2$ or greater than 1700 $mm^2$, in that case, the ratio of the first area to the projection of the ear on the sagittal plane of the body may be greater than 1.1 or less than 0.8. For example, the ratio of the fifth area to the projection of the ear on the sagittal plane of the body is in a range of 0.2 to 0.65, and the ratio of the sixth area to the projection of the ear on the sagittal plane of the body is in a range of 0.2 to 0.65.

The basic concept has been described above. Obviously, for the technicians of the arts, the above-mentioned detailed disclosure is only used as an example, and it does not constitute a limitation of the present disclosure. Although not explicitly described herein, various modifications, improvements, and corrections to the present disclosure may occur to those skilled in the art. Such modifications, improvements, and corrections are suggested in this present disclosure, so such modifications, improvements, and corrections still belong to the spirit and scope of the exemplary embodiments of this present disclosure.

At the same time, the present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various portions of this present disclosure are not necessarily all referring to the same embodiment. In addition, certain features, structures or characteristics of one or more embodiments of the present disclosure may be suitably combined.

In the same way, it should be noted that in order to simplify the expression disclosed in the present disclosure and help the understanding of one or more embodiments of the invention, in the foregoing description of the embodiments of the present disclosure, sometimes multiple features are combined into one embodiment, drawings or descriptions thereof. However, this disclosure method does not mean that the characteristics of the characteristics required for the present disclosure are more than the characteristics mentioned in the claims. Rather, claimed subject matter may lie in less than all features of a single foregoing disclosed embodiment.

Finally, it should be understood that the embodiments described in the present disclosure are only used to illustrate the principles of the embodiments of the present disclosure. Other deformation may also belong to the scope of this disclosure. Therefore, merely by way of example and not limitation, alternative configurations of the embodiments of the present disclosure may be considered consistent with the teachings of the present disclosure. Accordingly, the embodiments of the present disclosure are not limited to the embodiments introduced and described in the present disclosure explicitly.

What is claimed is:

1. An open earphone comprising:

a sound producer including a transducer and a housing accommodating the transducer; and an ear hook, the ear hook including a first portion and a second portion, the first portion being hung between an ear and a head of a user, the second portion extending towards a side of the ear that is away from the head and connecting the sound producer, the sound producer being fixed in a position near an ear canal, and an opening of the ear canal being not blocked by the sound producer; wherein the ear hook and the sound producer form a first projection on a first plane, the first projection including an outer contour, a first end contour, an inner contour and a second end contour, the outer contour, the first end contour, the second end contour and a tangent segment connecting the first end contour and the second end contour jointly define a first closed curve, and when the open earphone is in a non-wearing state, a first area of the first closed curve is in a range of 1000 $mm^2$ to 1500 $mm^2$.

2. The open earphone of claim 1, wherein when the open earphone is in the non-wearing state, a ratio of the first area to a projection area of the ear on a sagittal plane of a human body is in a range of 0.7 to 0.95.

3. The open earphone of claim 1, wherein when the open earphone is in the non-wearing state, a ratio of a projection area of the sound producer on the first plane to the first area is in a range of 0.25 to 0.4.

4. The open earphone of claim 1, wherein an end of the first portion of the ear hook away from the second portion includes a battery compartment, the first end contour being a projection contour of a free end of the battery compartment on the first plane;

when the open earphone is in the non-wearing state, a ratio of a projection area of the battery compartment on the first plane to the first area is in a range of 0.15 to 0.25.

5. The open earphone of claim 1, wherein when the open earphone is in the non-wearing state, a distance between a position of a mass center of the open earphone and a polar point of the ear hook in a first direction is in a range of 24 mm to 31 mm, the first direction being perpendicular to a long axis direction of the sound producer in the first projection.

6. The open earphone of claim 5, wherein when the open earphone is in the non-wearing state, an angle between a line connecting the position of the mass center of the open earphone and the polar point of the ear hook in the first direction and the long axis of the sound producer in the first projection is in a range of 55° to 85°.

7. The open earphone of claim 1, wherein when the open earphone is in the non-wearing state, a distance between a position of a mass center of the open earphone and an upper apex of the ear hook is in a range of 25 mm to 32.5 mm.

8. The open earphone of claim 1, wherein when the open earphone is in the non-wearing state, a distance between a position of a mass center of the open earphone and a bottom side surface of the sound producer is in a range of 3 mm to 5.5 mm.

9. The open earphone of claim 1, wherein the tangent segment is tangent to the first end contour at a first tangent point, the tangent segment is tangent to the second end contour at a second tangent point, and when the open earphone is in the non-wearing state, an area of a triangle formed by the first tangent point, the second tangent point, and a polar point of the ear hook in a first direction is in a range of 150 $mm^2$ to 190 $mm^2$.

10. The open earphone of claim 9, wherein a length of the tangent segment is in a range of 14 mm to 22 mm.

11. The open earphone of claim 9, wherein when the open earphone is in the non-wearing state, a distance between the first tangent point and the polar point is in a range of 35 mm to 55 mm.

12. The open earphone of claim 9, wherein in the triangle formed by the first tangent point, the second tangent point, and the polar point, an angle formed at the first tangent point is in a range of 20° to 35°.

13. The open earphone of claim 9, wherein in the triangle formed by the first tangent point, the second tangent point, and the polar point, an angle formed at the second tangent point is in a range of 120° to 150°.

14. The open earphone of claim 9, wherein in the triangle formed by the first tangent point, the second tangent point, and the polar point, an angle formed at the polar point is between 10° and 22°.

15. The open earphone of claim 1, wherein when the open earphone is in the non-wearing state, the inner contour, the first end contour, the second end contour, and the tangent segment connecting the first end contour and the second end contour jointly define a third dosed curve, a third area of the third dosed curve being in a range of 300 $mm^2$ to 500 $mm^2$.

16. The open earphone of claim 1, wherein when the open earphone is in the non-wearing state, a maximum distance between a position of a mass center of the ear hook and the outer contour is in a range of 15 mm to 35 mm in a direction of a long axis of a projection of the sound producer on the first plane.

17. The open earphone of claim 1, wherein when the open earphone is in the non-wearing state, a distance between a position of a mass center of the open earphone and a long axis of a projection of the sound producer on the first plane is in a range of 5 mm to 10 mm.

18. The open earphone of claim 1, wherein when the open earphone is in the non-wearing state, a relative distance of a mass center of the sound producer relative to the mass center of the ear hook is in a range of 20 mm to 35 mm.

19. The open earphone of claim 4, wherein when the open earphone is in the non-wearing state, a relative distance of a mass center of the battery compartment relative to the mass center of the ear hook is in a range of 35 mm to 55 mm.

20. The open earphone of claim 4, wherein when the open earphone is in the non-wearing state, a relative distance of a mass center of the sound producer relative to the mass center of the battery compartment is in a range of 15 mm to 30 mm.

* * * * *